United States Patent
Robarts et al.

(10) Patent No.: US 9,906,474 B2
(45) Date of Patent: *Feb. 27, 2018

(54) AUTOMATED SELECTION OF APPROPRIATE INFORMATION BASED ON A COMPUTER USER'S CONTEXT

(71) Applicant: Microsoft Technology Licensing, LLC, Redmond, WA (US)

(72) Inventors: James O. Robarts, Redmond, WA (US); Dan Newell, Medina, WA (US); Kenneth H. Abbott, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 456 days.

This patent is subject to a terminal disclaimer.

(21) Appl. No.: 14/486,777

(22) Filed: Sep. 15, 2014

(65) Prior Publication Data

US 2015/0106467 A1   Apr. 16, 2015

Related U.S. Application Data

(63) Continuation of application No. 12/165,377, filed on Jun. 30, 2008, now Pat. No. 9,183,306, which is a
(Continued)

(51) Int. Cl.
*G06F 17/30* (2006.01)
*H04L 12/58* (2006.01)
(Continued)

(52) U.S. Cl.
CPC ........ *H04L 51/12* (2013.01); *G06F 17/30867* (2013.01); *G06Q 10/107* (2013.01); *G06Q 30/02* (2013.01)

(58) Field of Classification Search
CPC ... A61B 5/681; A61B 5/02427; A61B 5/0002; A61B 5/4812; A61B 5/0205;
(Continued)

(56) References Cited

U.S. PATENT DOCUMENTS

| | | |
|---|---|---|
| 3,973,251 A | 8/1976 | Stephans |
| 4,009,943 A | 3/1977 | Horimoto |

(Continued)

FOREIGN PATENT DOCUMENTS

| | | |
|---|---|---|
| EP | 0661627 A1 | 7/1995 |
| EP | 0759591 A1 | 2/1997 |

(Continued)

OTHER PUBLICATIONS

Doorenbos, et al., "A Scalable Comparison-Shopping Agent for the World-Wide Web", In Proceedings of the First International Conference on Autonomous Agents, Feb. 8, 1997, pp. 39-48.
(Continued)

*Primary Examiner* — Tadeese Hailu
(74) *Attorney, Agent, or Firm* — Wade IP Law LLC

(57) ABSTRACT

A system filters received messages (e.g., unsolicited advertisements) to determine if they are appropriate for a user based on the non-static, constantly evolving, context of the user. The system can track the user's context by monitoring various environmental parameters, such as related to the user's physical, mental, computing and data environments, and can model the current context of the user based at least in part on the monitoring. The system selects a set of one or more filters to apply to incoming messages based on the user's context, and the selected filters can be updated as the user's context changes. Messages that survive the filters are then evaluated against the user's context to determine whether they should be presented immediately or stored for delayed presentation.

21 Claims, 10 Drawing Sheets

Related U.S. Application Data continuation of application No. 11/435,326, filed on May 16, 2006, now Pat. No. 7,395,507, which is a continuation of application No. 09/835,077, filed on Apr. 12, 2001, now Pat. No. 7,073,129, which is a continuation-in-part of application No. 09/216,193, filed on Dec. 18, 1998, now Pat. No. 6,466,232, and a continuation-in-part of application No. 09/464,659, filed on Dec. 15, 1999, now Pat. No. 6,513,046, and a continuation-in-part of application No. 09/825,159, filed on Apr. 2, 2001, now Pat. No. 7,076,737, said application No. 09/835,077 is a continuation-in-part of application No. 09/824,900, filed on Apr. 2, 2001, now Pat. No. 6,968,333.

(60) Provisional application No. 60/193,999, filed on Apr. 2, 2000, provisional application No. 60/194,000, filed on Apr. 2, 2000, provisional application No. 60/194,758, filed on Apr. 2, 2000, provisional application No. 60/196,625, filed on Apr. 12, 2000, provisional application No. 60/240,964, filed on Oct. 18, 2000.

(51) Int. Cl.
*G06Q 10/10* (2012.01)
*G06Q 30/02* (2012.01)

(58) Field of Classification Search
CPC . A61B 5/02405; A61B 5/6843; A61B 5/6844; A61B 5/6886; A61B 5/4035; A61B 5/02438; A61B 5/1118; A61B 5/11; G06F 1/3209; G06F 1/163; G06F 9/542; G06F 11/30; G06F 9/546; G06F 3/0481; G06Q 10/107; G06Q 30/0269; H04L 51/12; H04L 67/26; G06K 9/00664; G06K 9/00671; G06K 9/00288; G06K 9/00335; G06K 9/00302
See application file for complete search history.

(56) References Cited

U.S. PATENT DOCUMENTS

| | | |
|---|---|---|
| 4,283,712 A | 8/1981 | Goody |
| 4,458,331 A | 7/1984 | Amezcua et al. |
| 4,569,026 A | 2/1986 | Best |
| 4,815,030 A | 3/1989 | Cross et al. |
| 4,901,096 A | 2/1990 | Lemelson |
| 4,905,163 A | 2/1990 | Garber et al. |
| 4,916,441 A | 4/1990 | Gombrich |
| 4,970,683 A | 11/1990 | Harshaw et al. |
| 4,991,087 A | 2/1991 | Burkowski et al. |
| 5,032,083 A | 7/1991 | Friedman |
| 5,133,075 A | 7/1992 | Risch |
| 5,201,034 A | 4/1993 | Matsuura et al. |
| 5,227,614 A | 4/1993 | Danielson et al. |
| 5,208,449 A | 5/1993 | Eastman et al. |
| 5,214,757 A | 5/1993 | Mauney et al. |
| 5,237,684 A | 8/1993 | Record et al. |
| 5,251,294 A | 10/1993 | Abelow |
| 5,267,147 A | 11/1993 | Harshaw et al. |
| 5,278,946 A | 1/1994 | Shimada et al. |
| 5,285,398 A | 2/1994 | Janik |
| 5,295,064 A | 3/1994 | Malec et al. |
| 5,317,568 A | 5/1994 | Bixby et al. |
| 5,327,529 A | 7/1994 | Fults et al. |
| 5,335,276 A | 8/1994 | Thompson et al. |
| 5,337,413 A | 8/1994 | Lui et al. |
| 5,339,395 A | 8/1994 | Pickett et al. |
| 5,349,654 A | 9/1994 | Bond et al. |
| 5,353,399 A | 10/1994 | Kuwamoto et al. |
| 5,388,198 A | 2/1995 | Layman et al. |
| 5,398,021 A | 3/1995 | Moore |
| 5,416,730 A | 5/1995 | Lookofsky et al. |
| 5,454,074 A | 9/1995 | Hartel et al. |
| 5,470,233 A | 11/1995 | Fruchterman et al. |
| 5,471,629 A | 11/1995 | Risch |
| 5,481,265 A | 1/1996 | Russell |
| 5,481,667 A | 1/1996 | Bieniek et al. |
| 5,493,692 A | 2/1996 | Theimer et al. |
| 5,506,580 A | 4/1996 | Whiting et al. |
| 5,513,646 A | 5/1996 | Lehrman et al. |
| 5,522,024 A | 5/1996 | Hiraga et al. |
| 5,522,026 A | 5/1996 | Records et al. |
| 5,535,323 A | 7/1996 | Miller et al. |
| 5,537,618 A | 7/1996 | Boulton et al. |
| 5,539,665 A | 7/1996 | Lamming et al. |
| 5,544,321 A | 8/1996 | Theimer et al. |
| 5,553,609 A | 9/1996 | Chen et al. |
| 5,555,376 A | 9/1996 | Theimer et al. |
| 5,559,520 A | 9/1996 | Barzegar et al. |
| 5,560,012 A | 9/1996 | Ryu et al. |
| 5,566,337 A | 10/1996 | Szymanski et al. |
| 5,568,645 A | 10/1996 | Morris et al. |
| 5,572,401 A | 11/1996 | Carroll |
| 5,592,664 A | 1/1997 | Starkey |
| 5,601,435 A | 2/1997 | Quy |
| 5,603,054 A | 2/1997 | Theimer et al. |
| 5,611,050 A | 3/1997 | Theimer et al. |
| 5,642,303 A | 6/1997 | Small et al. |
| 5,646,629 A | 7/1997 | Loomis et al. |
| 5,659,746 A | 8/1997 | Bankert et al. |
| 5,675,358 A | 10/1997 | Bullock et al. |
| 5,689,619 A | 11/1997 | Smyth et al. |
| 5,689,708 A | 11/1997 | Regnier et al. |
| 5,701,894 A | 12/1997 | Cherry et al. |
| 5,704,366 A | 1/1998 | Tacklind et al. |
| 5,710,884 A | 1/1998 | Dedrick |
| 5,715,451 A | 2/1998 | Marlin |
| 5,717,747 A | 2/1998 | Boyle, III et al. |
| 5,719,744 A | 2/1998 | Jenkins et al. |
| 5,726,660 A | 3/1998 | Purdy et al. |
| 5,726,688 A | 3/1998 | Siefert et al. |
| 5,738,102 A | 4/1998 | Lemelson |
| 5,740,037 A | 4/1998 | McCann et al. |
| 5,742,279 A | 4/1998 | Yamamoto et al. |
| 5,745,110 A | 4/1998 | Ertemalp |
| 5,751,260 A | 5/1998 | Nappi et al. |
| 5,752,019 A | 5/1998 | Rigoutsos et al. |
| 5,754,938 A | 5/1998 | Herz et al. |
| 5,761,662 A | 6/1998 | Dasan |
| 5,769,085 A | 6/1998 | Kawakami et al. |
| 5,781,913 A | 7/1998 | Felsenstein et al. |
| 5,787,234 A | 7/1998 | Molloy |
| 5,787,279 A | 7/1998 | Rigoutsos |
| 5,790,974 A | 8/1998 | Tognazzini |
| 5,794,235 A | 8/1998 | Chess |
| 5,796,952 A | 8/1998 | Davis et al. |
| 5,798,733 A | 8/1998 | Ethridge |
| 5,806,079 A | 9/1998 | Rivette et al. |
| 5,812,865 A | 9/1998 | Theimer et al. |
| 5,818,446 A | 10/1998 | Bertram et al. |
| 5,826,253 A | 10/1998 | Bredenberg |
| 5,831,594 A | 11/1998 | Tognazzini et al. |
| 5,832,296 A | 11/1998 | Wang et al. |
| 5,835,087 A | 11/1998 | Herz et al. |
| 5,852,814 A | 12/1998 | Allen |
| 5,867,171 A | 2/1999 | Murata et al. |
| 5,873,070 A | 2/1999 | Bunte et al. |
| 5,878,274 A | 3/1999 | Kono et al. |
| 5,879,163 A | 3/1999 | Brown et al. |
| 5,881,231 A | 3/1999 | Takagi et al. |
| 5,899,963 A | 5/1999 | Hutchings |
| 5,902,347 A | 5/1999 | Backman et al. |
| 5,905,492 A | 5/1999 | Straub et al. |
| 5,910,765 A | 6/1999 | Slemon et al. |
| 5,910,799 A | 6/1999 | Carpenter et al. |
| 5,911,132 A | 6/1999 | Sloane |
| 5,913,030 A | 6/1999 | Lotspiech et al. |
| 5,918,014 A | 6/1999 | Robinson |
| 5,920,852 A | 7/1999 | Graupe |

(56) References Cited

U.S. PATENT DOCUMENTS

| | | |
|---|---|---|
| 5,924,074 A | 7/1999 | Evans |
| 5,930,501 A | 7/1999 | Neil |
| 5,937,160 A | 8/1999 | Davis et al. |
| 5,938,721 A | 8/1999 | Dussell et al. |
| 5,942,986 A | 8/1999 | Shabot et al. |
| 5,945,988 A | 8/1999 | Williams et al. |
| 5,948,041 A | 9/1999 | Abo et al. |
| 5,953,718 A | 9/1999 | Wical |
| 5,959,611 A | 9/1999 | Smailagic et al. |
| 5,963,914 A | 10/1999 | Skinner et al. |
| 5,963,940 A | 10/1999 | Liddy et al. |
| 5,966,126 A | 10/1999 | Szabo |
| 5,966,533 A | 10/1999 | Moody |
| 5,966,710 A | 10/1999 | Burrows |
| 5,971,580 A | 10/1999 | Hall et al. |
| 5,974,262 A | 10/1999 | Fuller et al. |
| 5,977,968 A | 11/1999 | Le Blanc |
| 5,978,603 A | 11/1999 | Shiozaki et al. |
| 5,983,335 A | 11/1999 | Dwyer, III |
| 5,991,687 A | 11/1999 | Hale et al. |
| 5,991,735 A | 11/1999 | Gerace |
| 5,995,956 A | 11/1999 | Nguyen |
| 5,999,932 A | 12/1999 | Paul |
| 5,999,943 A | 12/1999 | Nori et al. |
| 5,999,975 A | 12/1999 | Kittaka et al. |
| 6,002,982 A | 12/1999 | Fry |
| 6,002,994 A | 12/1999 | Lane et al. |
| 6,003,082 A | 12/1999 | Gampper et al. |
| 6,006,251 A | 12/1999 | Toyouchi et al. |
| 6,012,152 A | 1/2000 | Douik et al. |
| 6,014,638 A | 1/2000 | Burge et al. |
| 6,023,729 A | 2/2000 | Samuel et al. |
| 6,031,455 A | 2/2000 | Grube et al. |
| 6,035,264 A | 3/2000 | Donaldson et al. |
| 6,041,331 A | 3/2000 | Weiner et al. |
| 6,041,365 A | 3/2000 | Kleinerman |
| 6,044,415 A | 3/2000 | Futral et al. |
| 6,047,301 A | 4/2000 | Bjorklund et al. |
| 6,047,327 A | 4/2000 | Tso et al. |
| 6,055,516 A | 4/2000 | Johnson et al. |
| 6,055,536 A | 4/2000 | Shimakawa et al. |
| 6,061,610 A | 5/2000 | Boer |
| 6,061,660 A | 5/2000 | Eggleston et al. |
| 6,064,943 A | 5/2000 | Clark et al. |
| 6,067,084 A | 5/2000 | Fado et al. |
| 6,076,166 A | 6/2000 | Moshfeghi et al. |
| 6,081,814 A | 6/2000 | Mangat et al. |
| 6,085,086 A | 7/2000 | La Porta et al. |
| 6,088,689 A | 7/2000 | Kohn et al. |
| 6,091,411 A | 7/2000 | Straub et al. |
| 6,092,101 A | 7/2000 | Birrell et al. |
| 6,094,625 A | 7/2000 | Ralston |
| 6,098,065 A | 8/2000 | Skillen et al. |
| 6,105,063 A | 8/2000 | Hayes, Jr. et al. |
| 6,108,197 A | 8/2000 | Janik |
| 6,108,665 A | 8/2000 | Bair et al. |
| 6,112,246 A | 8/2000 | Horbal et al. |
| 6,122,348 A | 9/2000 | French-St. George et al. |
| 6,122,657 A | 9/2000 | Hoffman, Jr. et al. |
| 6,122,960 A | 9/2000 | Hutchings et al. |
| 6,127,990 A | 10/2000 | Zwern |
| 6,128,663 A | 10/2000 | Thomas |
| 6,131,067 A | 10/2000 | Girerd et al. |
| 6,134,532 A | 10/2000 | Lazarus et al. |
| 6,141,011 A | 10/2000 | Bodnar et al. |
| 6,148,067 A | 11/2000 | Leipow |
| 6,154,745 A | 11/2000 | Kari et al. |
| 6,155,960 A | 12/2000 | Roberts et al. |
| 6,157,982 A | 12/2000 | Deo et al. |
| 6,164,541 A | 12/2000 | Dougherty et al. |
| 6,169,976 B1 | 1/2001 | Colosso |
| 6,185,534 B1 | 2/2001 | Breese et al. |
| 6,188,399 B1 | 2/2001 | Voas et al. |
| 6,195,622 B1 | 2/2001 | Altschuler et al. |
| 6,198,394 B1 | 3/2001 | Jacobsen et al. |
| 6,199,099 B1 | 3/2001 | Gershman et al. |
| 6,199,102 B1 | 3/2001 | Cobb |
| 6,215,405 B1 | 4/2001 | Handley et al. |
| 6,218,958 B1 | 4/2001 | Eichstaedt et al. |
| 6,230,111 B1 | 5/2001 | Mizokawa |
| 6,236,768 B1 | 5/2001 | Rhodes et al. |
| 6,256,633 B1 | 7/2001 | Dharap |
| 6,262,720 B1 | 7/2001 | Jeffrey et al. |
| 6,263,268 B1 | 7/2001 | Nathanson |
| 6,263,317 B1 | 7/2001 | Sharp et al. |
| 6,272,470 B1 | 8/2001 | Teshima |
| 6,272,507 B1 | 8/2001 | Pirolli et al. |
| 6,282,517 B1 | 8/2001 | Wolfe et al. |
| 6,282,537 B1 | 8/2001 | Madnick et al. |
| 6,285,757 B1 | 9/2001 | Carroll et al. |
| 6,285,889 B1 | 9/2001 | Nykanen et al. |
| 6,289,316 B1 | 9/2001 | Aghili et al. |
| 6,289,513 B1 | 9/2001 | Bentwich |
| 6,292,796 B1 | 9/2001 | Drucker et al. |
| 6,294,953 B1 | 9/2001 | Steeves |
| 6,301,609 B1 | 10/2001 | Aravamudan et al. |
| 6,305,007 B1 | 10/2001 | Mintz |
| 6,305,221 B1 | 10/2001 | Hutchings |
| 6,308,203 B1 | 10/2001 | Itabashi et al. |
| 6,311,162 B1 | 10/2001 | Reichwein et al. |
| 6,314,384 B1 | 11/2001 | Goetz |
| 6,317,718 B1 | 11/2001 | Fano |
| 6,321,158 B1 | 11/2001 | DeLorme et al. |
| 6,321,279 B1 | 11/2001 | Bonola |
| 6,324,569 B1 | 11/2001 | Ogilvie et al. |
| 6,327,535 B1 | 12/2001 | Evans et al. |
| 6,349,307 B1 | 2/2002 | Chen |
| 6,353,398 B1 | 3/2002 | Amin et al. |
| 6,353,823 B1 | 3/2002 | Kumar |
| 6,356,905 B1 | 3/2002 | Gershman et al. |
| 6,363,377 B1 | 3/2002 | Kravets et al. |
| 6,385,589 B1 | 5/2002 | Trusheim et al. |
| 6,392,670 B1 | 5/2002 | Takeuchi et al. |
| 6,401,085 B1 | 6/2002 | Gershman et al. |
| 6,405,159 B2 | 6/2002 | Bushey et al. |
| 6,405,206 B1 | 6/2002 | Kayahara |
| 6,418,424 B1 | 7/2002 | Hoftberg et al. |
| 6,421,700 B1 | 7/2002 | Holmes et al. |
| 6,427,142 B1 | 7/2002 | Zachary et al. |
| 6,430,531 B1 | 8/2002 | Polish |
| 6,438,618 B1 | 8/2002 | Lortz et al. |
| 6,442,549 B1 | 8/2002 | Schneider |
| 6,442,589 B1 | 8/2002 | Takahashi et al. |
| 6,442,620 B1 | 8/2002 | Thatte et al. |
| 6,446,057 B1 | 9/2002 | Vaughan |
| 6,446,076 B1 | 9/2002 | Burkey et al. |
| 6,446,109 B2 | 9/2002 | Gupta |
| 6,460,036 B1 | 10/2002 | Herz |
| 6,462,759 B1 | 10/2002 | Kurtzberg et al. |
| 6,466,232 B1 | 10/2002 | Newell et al. |
| 6,477,117 B1 | 11/2002 | Narayanaswami et al. |
| 6,483,485 B1 | 11/2002 | Huang et al. |
| 6,484,200 B1 | 11/2002 | Angal et al. |
| 6,487,552 B1 | 11/2002 | Lei et al. |
| 6,490,579 B1 | 12/2002 | Gao et al. |
| 6,505,196 B2 | 1/2003 | Drucker et al. |
| 6,507,567 B1 | 1/2003 | Willars |
| 6,507,845 B1 | 1/2003 | Cohen et al. |
| 6,513,046 B1 | 1/2003 | Abbott, III et al. |
| 6,519,552 B1 | 2/2003 | Sampath et al. |
| 6,526,035 B1 | 2/2003 | Atarius et al. |
| 6,529,723 B1 | 3/2003 | Bentley |
| 6,539,336 B1 | 3/2003 | Vock et al. |
| 6,542,889 B1 | 4/2003 | Aggarwal et al. |
| 6,546,005 B1 | 4/2003 | Berkley et al. |
| 6,546,425 B1 | 4/2003 | Hanson et al. |
| 6,546,554 B1 | 4/2003 | Schmidt et al. |
| 6,549,915 B2 | 4/2003 | Abbott, III et al. |
| 6,549,944 B1 | 4/2003 | Weinberg et al. |
| 6,553,336 B1 | 4/2003 | Johnson et al. |
| 6,558,050 B1 | 5/2003 | Ishibashi |
| 6,563,430 B1 | 5/2003 | Kemink et al. |
| 6,568,595 B1 | 5/2003 | Russell et al. |
| 6,571,279 B1 | 5/2003 | Herz et al. |

(56) References Cited

U.S. PATENT DOCUMENTS

| | | |
|---|---|---|
| 6,578,019 B1 | 6/2003 | Suda et al. |
| 6,615,197 B1 | 9/2003 | Chai |
| 6,625,135 B1 | 9/2003 | Johnson et al. |
| 6,629,133 B1 | 9/2003 | Philyaw et al. |
| 6,636,831 B1 | 10/2003 | Profit, Jr. et al. |
| 6,643,682 B1 | 11/2003 | Todd et al. |
| 6,643,684 B1 | 11/2003 | Malkin et al. |
| 6,652,283 B1 | 11/2003 | Van Schaack et al. |
| 6,661,437 B1 | 12/2003 | Miller et al. |
| 6,672,506 B2 | 1/2004 | Swartz et al. |
| 6,697,836 B1 | 2/2004 | Kawano et al. |
| 6,704,722 B2 | 3/2004 | Wang Baldonado |
| 6,704,785 B1 | 3/2004 | Koo et al. |
| 6,704,812 B2 | 3/2004 | Bakke et al. |
| 6,707,476 B1 | 3/2004 | Hochstedler |
| 6,712,615 B2 | 3/2004 | Martin |
| 6,714,977 B1 | 3/2004 | Fowler et al. |
| 6,718,332 B1 | 4/2004 | Sitaraman et al. |
| 6,738,040 B2 | 5/2004 | Jahn et al. |
| 6,738,759 B1 | 5/2004 | Wheeler et al. |
| 6,738,975 B1 | 5/2004 | Yee et al. |
| 6,741,188 B1 | 5/2004 | Miller et al. |
| 6,741,610 B1 | 5/2004 | Volftsun et al. |
| 6,747,675 B1 | 6/2004 | Abbott et al. |
| 6,751,620 B2 | 6/2004 | Orbanes et al. |
| 6,766,245 B2 | 7/2004 | Padmanabhan |
| D494,584 S | 8/2004 | Schlieffers et al. |
| 6,791,580 B1 | 9/2004 | Abbott et al. |
| 6,795,806 B1 | 9/2004 | Lewis et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,829,639 B1 | 12/2004 | Lawson et al. |
| 6,834,195 B2 | 12/2004 | Brandenberg et al. |
| 6,834,208 B2 | 12/2004 | Gonzales et al. |
| 6,837,436 B2 | 1/2005 | Swartz et al. |
| 6,842,877 B2 | 1/2005 | Robarts et al. |
| 6,850,252 B1 | 2/2005 | Hoffberg |
| 6,853,966 B2 | 2/2005 | Bushey et al. |
| 6,868,525 B1 | 3/2005 | Szabo |
| 6,874,017 B1 | 3/2005 | Inoue et al. |
| 6,874,127 B2 | 3/2005 | Newell et al. |
| 6,885,734 B1 | 4/2005 | Eberle et al. |
| 6,899,539 B1 | 5/2005 | Stallman et al. |
| 6,963,899 B1 | 11/2005 | Fernandez et al. |
| 6,968,333 B2 | 11/2005 | Abbott et al. |
| 7,000,187 B2 | 2/2006 | Messinger et al. |
| 7,010,501 B1 | 3/2006 | Roslak et al. |
| 7,010,603 B2 | 3/2006 | Martin, Jr. et al. |
| 7,040,541 B2 | 5/2006 | Swartz et al. |
| 7,046,263 B1 | 5/2006 | Abbott et al. |
| 7,055,101 B2 | 5/2006 | Abbott et al. |
| 7,058,893 B2 | 6/2006 | Abbott et al. |
| 7,058,894 B2 | 6/2006 | Abbott et al. |
| 7,062,715 B2 | 6/2006 | Abbott et al. |
| 7,063,263 B2 | 6/2006 | Swartz et al. |
| 7,076,737 B2 | 7/2006 | Abbott et al. |
| 7,080,322 B2 | 7/2006 | Abbott et al. |
| 7,089,497 B2 | 8/2006 | Abbott et al. |
| 7,096,253 B2 | 8/2006 | Vinson et al. |
| 7,103,806 B1 | 9/2006 | Horvitz |
| 7,107,539 B2 | 9/2006 | Abbott et al. |
| 7,110,764 B1 | 9/2006 | Blair et al. |
| 7,120,558 B2 | 10/2006 | McIntyre et al. |
| 7,124,125 B2 | 10/2006 | Cook et al. |
| 7,137,069 B2 | 11/2006 | Abbott et al. |
| 7,143,093 B1 | 11/2006 | Bracho et al. |
| 7,155,456 B2 | 12/2006 | Abbott, III et al. |
| 7,162,473 B2 | 1/2007 | Dumais et al. |
| 7,171,378 B2 | 1/2007 | Petrovich et al. |
| 7,195,157 B2 | 3/2007 | Swartz et al. |
| 7,203,906 B2 | 4/2007 | Abbott et al. |
| 7,225,229 B1 | 5/2007 | Abbott et al. |
| 7,231,439 B1 | 6/2007 | Abbott et al. |
| 7,260,453 B2 | 8/2007 | Poier et al. |
| 7,349,894 B2 | 3/2008 | Barth et al. |
| 7,360,152 B2 | 4/2008 | Capps et al. |
| 7,385,501 B2 | 6/2008 | Miller et al. |
| 7,386,477 B2 | 6/2008 | Fano |
| 7,392,486 B1 | 6/2008 | Gyde et al. |
| 7,395,221 B2 | 7/2008 | Doss et al. |
| 7,444,594 B2 | 10/2008 | Abbott et al. |
| 7,464,153 B1 | 12/2008 | Abbott et al. |
| 7,512,889 B2 | 3/2009 | Newell et al. |
| 7,533,052 B2 | 5/2009 | Tilfors et al. |
| 7,533,082 B2 | 5/2009 | Abbott et al. |
| 7,561,200 B2 | 7/2009 | Garvey, III et al. |
| 7,571,218 B2 | 8/2009 | Tanaka et al. |
| 7,613,695 B1 | 11/2009 | Solomon et al. |
| 7,614,001 B2 | 11/2009 | Abbott et al. |
| 7,647,400 B2 | 1/2010 | Abbott et al. |
| 7,689,919 B2 | 5/2010 | Abbott et al. |
| 7,734,780 B2 | 6/2010 | Abbott et al. |
| 7,739,607 B2 | 6/2010 | Abbott et al. |
| 7,779,015 B2 | 8/2010 | Abbott et al. |
| 7,827,281 B2 | 11/2010 | Abbott et al. |
| 7,877,686 B2 | 1/2011 | Abbott et al. |
| 7,945,859 B2 | 5/2011 | Abbott et al. |
| 8,020,104 B2 | 9/2011 | Robarts et al. |
| 8,103,665 B2 | 1/2012 | Abbott et al. |
| 8,626,712 B2 | 1/2014 | Abbott et al. |
| 2001/0011211 A1 | 8/2001 | Bushey et al. |
| 2001/0030664 A1 | 11/2001 | Abbott et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott et al. |
| 2002/0044152 A1 | 4/2002 | Abbott et al. |
| 2002/0052930 A1 | 5/2002 | Abbott et al. |
| 2002/0052963 A1 | 5/2002 | Abbott et al. |
| 2002/0054130 A1 | 5/2002 | Abbott et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0147880 A1 | 10/2002 | Wang Baldonado |
| 2002/0159770 A1 | 10/2002 | Moultrie, Jr. |
| 2002/0165462 A1* | 11/2002 | Westbrook ............ A61B 5/0205 600/529 |
| 2002/0191034 A1 | 12/2002 | Sowizral et al. |
| 2003/0025798 A1 | 2/2003 | Grosvenor et al. |
| 2003/0036685 A1* | 2/2003 | Goodman ............ A61B 5/0002 600/300 |
| 2003/0046401 A1 | 3/2003 | Abbott et al. |
| 2003/0154476 A1 | 8/2003 | Abbott et al. |
| 2003/0186201 A1 | 10/2003 | Martin |
| 2003/0208113 A1* | 11/2003 | Mault ................ A61B 5/14532 600/316 |
| 2003/0229900 A1 | 12/2003 | Reisman |
| 2004/0088328 A1 | 5/2004 | Cook et al. |
| 2004/0133600 A1 | 7/2004 | Homer |
| 2004/0186854 A1 | 9/2004 | Choi et al. |
| 2004/0201500 A1 | 10/2004 | Miller et al. |
| 2004/0215663 A1 | 10/2004 | Liu et al. |
| 2004/0267700 A1 | 12/2004 | Dumais et al. |
| 2004/0267812 A1 | 12/2004 | Harris et al. |
| 2005/0027704 A1 | 2/2005 | Hammond et al. |
| 2005/0034078 A1 | 2/2005 | Abbott et al. |
| 2005/0066282 A1 | 3/2005 | Abbott et al. |
| 2005/0086243 A1 | 4/2005 | Abbott et al. |
| 2005/0160113 A1 | 7/2005 | Sipusic et al. |
| 2005/0165843 A1 | 7/2005 | Capps et al. |
| 2005/0193017 A1 | 9/2005 | Kim |
| 2005/0266858 A1 | 12/2005 | Miller et al. |
| 2005/0272442 A1 | 12/2005 | Miller et al. |
| 2006/0004680 A1 | 1/2006 | Robarts et al. |
| 2006/0019676 A1 | 1/2006 | Miller et al. |
| 2006/0136393 A1 | 6/2006 | Abbott et al. |
| 2006/0259494 A1 | 11/2006 | Watson et al. |

(56) References Cited

U.S. PATENT DOCUMENTS

| | | |
|---|---|---|
| 2007/0022384 A1 | 1/2007 | Abbott et al. |
| 2007/0043459 A1 | 2/2007 | Abbott et al. |
| 2007/0089067 A1 | 4/2007 | Abbott et al. |
| 2007/0130524 A1 | 6/2007 | Abbott et al. |
| 2007/0168502 A1 | 7/2007 | Abbott et al. |
| 2007/0185864 A1 | 8/2007 | Budzik et al. |
| 2007/0266318 A1 | 11/2007 | Abbott et al. |
| 2008/0090591 A1 | 4/2008 | Miller et al. |
| 2008/0091537 A1 | 4/2008 | Miller et al. |
| 2008/0147775 A1 | 6/2008 | Abbott et al. |
| 2008/0161018 A1 | 7/2008 | Miller et al. |
| 2008/0313271 A1 | 12/2008 | Abbott et al. |
| 2009/0005079 A1 | 1/2009 | Shields et al. |
| 2009/0055752 A1 | 2/2009 | Abbott et al. |
| 2009/0094524 A1 | 4/2009 | Abbott et al. |
| 2009/0150535 A1 | 6/2009 | Abbott et al. |
| 2009/0228552 A1 | 9/2009 | Abbott et al. |
| 2009/0234878 A1 | 9/2009 | Herz et al. |
| 2009/0282030 A1 | 11/2009 | Abbott et al. |
| 2010/0217862 A1 | 8/2010 | Abbott et al. |
| 2010/0257235 A1 | 10/2010 | Abbott et al. |
| 2010/0262573 A1 | 10/2010 | Abbott et al. |

FOREIGN PATENT DOCUMENTS

| | | |
|---|---|---|
| EP | 0801342 A2 | 10/1997 |
| EP | 0823813 A2 | 2/1998 |
| EP | 0846440 A2 | 6/1998 |
| EP | 0924615 A2 | 6/1999 |
| JP | H05-260188 A | 10/1993 |
| JP | H09-091112 A | 4/1997 |
| JP | H11-306002 A | 11/1999 |
| WO | 90/08361 A1 | 7/1990 |
| WO | 95/31773 A1 | 11/1995 |
| WO | 97/03434 A1 | 1/1997 |
| WO | 97/34388 A2 | 9/1997 |
| WO | 98/00787 A1 | 1/1998 |
| WO | 98/47084 A1 | 10/1998 |
| WO | 99/17228 A1 | 4/1999 |
| WO | 99/26180 A1 | 5/1999 |
| WO | 99/66394 A1 | 12/1999 |
| WO | 99/67698 A2 | 12/1999 |
| WO | 00/36493 A1 | 6/2000 |

OTHER PUBLICATIONS

Fickas, et al., "Software Organization for Dynamic and Adaptable Wearable Systems", In First International Symposium on Wearable Computers, Digest of Papers, Oct. 1997, pp. 56-63.

Gabbard, et al., "A Taxonomy of Usability Characteristics in Virtual Environments", Available at <<http://people.cs.vt.edu/~jgabbard/publications/framework97.pdf>>, Nov. 1997, 193 Pages.

Gavrilova, et al., "An Approach to Mapping of User Model to Corresponding Interface Parameters", In Proceedings of the Workshop "Embedding User Models in Intelligent Applications" on 6th International Conference on User Modeling, Jun. 1997, pp. 24-29.

Rogers, et al., "Outbreak Agent: Intelligent Wearable Technology for Hazardous Environments", In Proceedings of the 1997 IEEE International Conference on Systems, Man and Cybernetics, Oct. 12, 1997, pp. 3198-3203.

Schmidt, et al., "There is More to Context Than Location", In Computers and Graphics, vol. 23, Issue 6, Dec. 1999, pp. 893-901.

Kirsch, Dana, "The Sentic Mouse: Developing a Tool for Measuring Emotional Valence", Available at <<http://www.media.mit.edu/affect/AC_research/projects/sentic_mouse.html>>, Retrieved on: Oct. 2, 1998, pp. 1-2.

""Affective Understanding": Modeling and Responding to User Affect", Available at <<http://www.media.mit.edu/affect/AC_research/understanding.html, Retrieved on: Oct. 2, 1998, pp. 1-3.

"Alps GlidePoint", Available at <<http://www.alps.com/p17.html>>, Retrieved on: Oct. 2, 1998, p. 1.

"GyroPoint Technology", Available at <<http://www.gyration.com/html/gyropoint.html>>, Retrieved on: Oct. 2, 1998, pp. 1-3.

"Haptics", Available at <<http://www.ai.mit.edu/projects/handarm-haptics/haptics.html>>, Retrieved on: Oct. 2, 1998, pp. 1-2.

"Research Areas in Affective Computing", Available at <<http://www.media.mit.edu/affect/>>, Retrieved on: Oct. 2, 1998, p. 1.

"Research on Affective Pattern Recognition and Modeling", Available at <<http://www.media.mit.edu/affect/AC_research/recognizing.html>>, Retrieved on: Oct. 2, 1998, pp. 1-4.

"Research on Sensing Human Affect", Available at <<http://www.media.mit.edu/affect/AC_research/sensing.html>>, Retrieved on: Oct. 2, 1998, pp. 1-5.

"Smart Rooms", Available at <<http://vismod.www.media.mit.edu/vismod/demos/smartroom/>>, Retrieved on: Oct. 2, 1998, pp. 1-3.

"SmartDesk Home Page", Available at <<http://vismod.www.media.mit.edu/vismod/demos/smartdesk/>>, Retrieved on: Oct. 2, 1998, pp. 1-4.

"The MIT Wearable Computing Web Page", Available at <<http://wearables.www.media.mit.edu/projects/wearables/>>, Retrieved on: Oct. 2, 1998, pp. 1-3.

"Wearable Computer Systems for Affective Computing", Available at <<http://www.media.mit.deu/affect/AC_research/wearables.html>>, Retrieved on: Oct. 2, 1998, pp. 1-5.

Aoki, et al., "Realtime Personal Positioning System for a Wearable Computer", In 3rd International Symposium on Wearable Computers, Oct. 1999, pp. 37-43.

Bauer, et al., "A Collaborative Wearable System with Remote Sensing", In 16th International Symposium on Wearable Computers, Oct. 1998, 8 Pages.

Bier, et al., "Toolglass and Magic Lenses: The See-Through Interface", In Proceedings of the 20th Annual Conference on Computer Graphics and Interactive Techniques, Sep. 1993, pp. 73-80.

"It's a Sport Watch that Thinks it's a PDA!", Available at <<http://assets.timex.com/datalink/>>, Retrieved on: Aug. 5, 2014, 1 Page.

Bowskill, et al., "Wearable Location Mediated Telecommunications; A First Step Towards Contextual Communication", In 3rd International Symposium on Wearable Computers, Oct. 1999, pp. 159-166.

Dey, et al., "The Conference Assistant: Combining Context-Awareness with Wearable Computing", In 3rd International Symposium on Wearable Computers, Oct. 1999, pp. 21-28.

Finger, et al., "Rapid Design and Manufacture of Wearable Computers", In Communication of the ACM, vol. 39, Issue 2, Feb. 1996, pp. 63-70.

Golding, et al., "Indoor Navigation Using a Diverse Set of Cheap, Wearable Sensors", In 3rd International Symposium on Wearable Computers, Oct. 1999, pp. 29-36.

Hull, et al., "Towards Situated Computing", In First International Symposium on Wearable Computers, Oct. 1997, pp. 146-153.

Jakobovits, Rex, "Integrating Autonomous Heterogeneous Information Sources", A Technical Report UW-CSE-971205, Jul. 15, 1997, 28 Pages.

Kortuem, et al., "Context-Aware, Adaptive Wearable Computers as Remote Interfaces to 'Intelligent' Environments", In 16th International Symposium on Wearable Computers, Oct. 1998, pp. 58-65.

Kortuem, et al., "When Cyborgs Meet: Building Communities of Cooperating Wearable Agents", In 3rd International Symposium on Wearable Computers, Oct. 1999, pp. 124-132.

Lashkari, et al., "Collaborative Interface Agents", In Proceedings of the Twelfth National Conference on Artificial Intelligence, Aug. 1994, 4 Pages.

Lehikoinen, et al., "MEX: A Distributed Software Architecture for Wearable Computers", In 3rd International Symposium on Wearable Computers, Oct. 1999, pp. 52-57.

Leonhardi, et al., "Virtual Information Towers—A Metaphor for Intuitive, Location-Aware Information Access in a Mobile Environment", In 3rd International Symposium on Wearable Computers, Oct. 1999, pp. 15-20.

Lunt, et al., "Knowledge-Based Intrusion Detection", In Proceedings of the Annual Artificial Intelligence Systems in Government Conference, Mar. 1989, pp. 102-107.

(56) References Cited

OTHER PUBLICATIONS

Maes, Pattie, "Agents That Reduce Work and Information Overload", In Communications of the ACM, vol. 37, Issue 7, Jul. 1994, pp. 30-40.
Mann, Steve, "Smart Clothing': Wearable Multimedia Computing and 'Personal Imaging' to Restore the Technological Balance Between People and Their Environments", In Proceedings of the Fourth ACM International Conference on Multimedia, Nov. 1996, pp. 163-174.
Metz, Cade, "MIT: Wearable PCs, Electronic Ink, and Smart Rooms", In PC Magazaine, Jun. 1998, pp. 192-193.
Oakes, Chris, "The Truman Show Realized?", Available at <<http://www.wired.com/news/news/technology/story/15745.html>>, Published on: Oct. 21, 1998, pp. 1-4.
Picard, et al., "Affective Wearables", In Personal Technologies, vol. 1, Issue 4, Oct. 1997, 8 Pages.
Rekimoto, et al., "The World Through the Computer: Computer Augmented Interaction with Real World Environments", In Proceedings of the 8th Annual ACM Symposium on User Interface and Software Technology, Dec. 1995, pp. 29-36.
Rhodes, Bradley, "WIMP Interface Considered Fatal", Available at http://rhodes.www.media.mit.edu/people/rhodes/Papers/no-wimp.html, Retrieved on: Sep. 23, 1998, pp. 1-3.
Rhodes, Bradley J., "The Wearable Remembrance Agent: A System for Augmented Memory", In Proceedings of the First International Symposium on Wearable Computers, Oct. 13, 1997, pp. 123-128.
Sato, et al., "Autonomous Behavior Control of Virtual Actors Based on the Air Model", In Proceedings of IEEE Computer Animation, Jun. 1997, pp. 113-118.
Schneider, et al., "Modeling Wearable Negotiation in an Opportunistic Task Oriented Domain", In International Symposium on Wearable Computers, Oct. 1999, 2 Pages.
Smailagic, et al., "Matching Interface Design with User Tasks: Modalities of Interaction with CMU Wearable Computers", In IEEE Personal Communications, Feb. 1996, pp. 14-25.
Smailagic, et al., "MoCCA: A Mobile Communication and Computing Architecture", In 3rd International Symposium on Wearable Computers, Oct. 1999, pp. 64-71.
Starner, et al., "Visual Contextual Awareness in Wearable Computing", In 2nd International Symposium on Wearable Computers, Oct. 1998, 8 Pages.
Tan, et al., "Tactual Displays for Wearable Computing", In First International Symposium on Wearable Computers, Oct. 1997, pp. 84-89.
Yang, et al., "Smart Sight: A Tourist Assistant System", In 3rd International Symposium on Wearable Computers, Oct. 1999, pp. 73-78.
"Intelligent User Interface Prompt Level", An IBM Technical Disclosure Bulletin, vol. 35, Issue 1A, Jun. 1992, pp. 25-26.
Teranishi, et al., "Dynamic Object Recomposition for Active Information System on Mobile Environment", In Proceedings of the International Conference on International Database Engineering and Applications Symposium, Aug. 1997, pp. 220-228.
"Final Office Action Issued in U.S. Appl. No. 12/165,377", dated Jun. 30, 2010, Filed Date: Jun. 30, 2008, 18 Pages.
"Non-final Office Action Issued in U.S. Appl. No. 12/165,377", dated Oct. 26, 2010, Filed Date: Jun. 30, 2008, 27 Pages.
"Final Office Action Issued in U.S. Appl. No. 12/165,377", dated Apr. 5, 2011, Filed Date: Jun. 30, 2008, 21 Pages.
"Non-final Office Action Issued in U.S. Appl. No. 12/165,377", dated Jun. 7, 2013, Filed Date: Jun. 30, 2008, 10 Pages.
"Notice of Allowance Issued in U.S. Appl. No. 12/165,377", dated Mar. 17, 2014, Filed Date: Jun. 30, 2008, 7 Pages.
Wardell, Brad, "Stardock.net Releases WindowBlinds", Stardock.net Inc., Available at <<http://stardock.net/media/pr_wb10.html>>, Oct. 4, 1999, 2 Pages.
Weiser, Mark, "Some Computer Science Issues in Ubiquitous Computing", In Communications of the ACM, vol. 36, Issue 7, Jul. 1993, pp. 75-84.
Weiser, Mark, "The Computer for the 21st Century", In Scientific American Journal, vol. 265, Issue 3, Sep. 1991, 8 Pages.
"SmartWatch", Available at <<http://www.sonymobile.com/in/products/accessories/smartwatch/?utm_souroo=marketing-url&utm_medium=/in/products/accessories/smartwateh/&utm_campaign=http://www.sonymobile.com/smartwatch>>, Retrieved on: Aug. 5, 2014, 3 Pages.
"Pebble Smartwatch | Smartwatch for iPhone & Android", Available at <<http://getpebble.com/>>, Retrieved on: Aug. 5, 2014, 9 Pages.
"Motoactv—Motorola Mobility", Available at <<https://motoactv.com/>>, Retrieved on: Aug. 5, 2014, 1 Page.
"LiveViewTM", Available at <<http://www.sonymobile.com/global-en/suppor/accessories/liveview/>>, Retrieved on: Aug. 5, 2014, 1 Page.
"Office Action Issued in U.S. Appl. No. 10/790,602", dated Jun. 8, 2009, 13 Pages.
"Search Report Issued in European Patent application No. 02017656.6", dated Mar. 18, 2009, 3 Pages.
Salser, et al., "The Design and Use of a Generic Context Server", A Technical Report GIT-GVU-98-32, Nov. 1998, 7 Pages.
"BridgeView and LabView, G Programming Reference Manual", National Instruments Corporation, Jan. 1998, 667 Pages.
"Context Recognition by User Situation Data Analysis (Context)", Available at <<http://www.cs.helsinki.fi/group/context/>>, Retrieved on: Dec. 9, 2008, 7 Pages.
"LabView User Manual", , National Instruments Corporation, Jan. 1998, 514 Pages.
"Workshop on Wearable Computing Systems", Aug. 19-21, 1996, 3 Pages.
Amon, et al., "Integration of Design Education, Research and Practice at Carnegie Mellon University: A Multi-Disciplinary Course in Wearable Computer Design", In Proceedings of the Frontiers Education Conference, Nov. 1995, 9 Pages.
Bacon, et al., "Using Events to Build Distributed Applications", In Second International Workshop on Services in Distributed and Networked Environments, Jun. 1995. 99. 148-155.
Bates, et al., "Middleware Support for Mobile Multimedia Applications", An ICL System Journal, vol. 12, Nov. 1997, 20 Pages.
Billinghurst, et al., "An Evaluation of Wearable Information Spaces", In Proceedings of the Virtual Reality Annual International Symposium, Mar. 1998, 8 Pages.
Billinghurst, "Research Directions in Wearable Computing", University of Washington, May 1998, 48 Pages.
Bishop, Todd, "Hard Wear", A Puget Sound Business Journal, Jul. 28, 2000, 4 Pages.
Biskup, et al., "Towards Secure Mediation", In Sicherheit and Electronic Commerce, Oct. 1999, 17 Pages.
Brown, et al., "Using Explicit Requirements and Metrics for Interface Agent User Model Correction", In Proceedings of the Second International Conference on Autonomous Agents, May 1998, 7 Pages.
Brown, et al., "Utility Theory-Based User Models for Intelligent Interface Agents", In Advances in Artificial Intelligence, Jun. 1998, 15 Pages.
Budzik, et al., "Watson: Anticipating and Contextualizing Information Needs", In Proceedings of the 62nd Annual Meeting of the American Society for Information Science, Nov. 1999, 14 Pages.
Chen, et al., "A Survey of Context-Aware Mobile Computing Research", A Dartmouth Computer Science Technical Report TR2000-381, Nov. 2000, 16 Pages.
Cochran, Shannon, "The Development of Wearable Computing", Dr. Dobb's, Online Edition, Jul. 21, 2008, pp. 1-2.
Crabtree, et al., "Wearable Computing and the Remembrance Agent", A BT Technology Journal, vol. 16, Issue 3, Jul. 1998, pp. 118-124.
Cugola, et al., "Exploiting an Event-Based Infrastructure to Develop Complex Distributed Systems", In Proceedings International Conference on Software Engineering, Apr. 1998, pp. 261-270.
D'Orazio, et al., "Mobile Robot Position Determination Using Visual Landmarks", In IEEE Transactions on Industrial Electronics, vol. 41, Issue 6, Dec. 1994, pp. 654-662.

(56) References Cited

OTHER PUBLICATIONS

Dechamboux, et al., "Using a Distributed Shared Memory for Implementing Efficient Information Mediators", In Proceedings of the International Conference and Exhibition on High-Performance Computing and Networking, Apr. 1996, 5 Pages.
Dey, et al., "CyberDesk: A Framework for Providing Self-Integrating Context-Aware Services", In Knowledge-Based Systems, vol. 11, Sep. 1998, pp. 3-13.
"Office Action Issued in European Patent Application No. 01964695.9", dated Feb. 13, 2009, 4 Pages.
Goh, et al., "Content Interchange: New Features and Formalisms for the Intelligent Integration of Information", In ACM Transactions on Information Systems, vol. 17, Issue 3, Jul. 1999, pp. 270-293.
Goharian, et al., "Enterprise Text Processing: A Sparse Matrix Approach", In Proceedings of the International Conference on Information Technology: Coding and Computing, Apr. 2001, pp. 71-75.
Goodridge, Steven G., "The Environment Understanding Interface: Detecting and Tracking Human Activity Through Multimedia Sensors", In Proceedings of the Conference of the Centre for Advanced Studies on Collaborative Research, Nov. 1995, 8 Pages.
Han, et al., "DBMiner: A System for Mining Knowledge in Large Relational Database", In Proceedings of the International Conference on Data Mining and Knowledge Discovery, Aug. 1996, 6 Pages.
Harter, et al., "A Distributed Location System for the Active Office", In IEEE Network, vol. 8, Issue 1, Jan. 1994, pp. 62-70.
Horvitz, et al., "Attention-Sensitive Alerting", In Proceedings of the Fifteenth Conference on Uncertainty in Artificial Intelligence, Jul. 1999, pp. 305-313.
Horvitz, et al., "In Pursuit of Effective Handsfree Decision Support: Coupling Bayesian Interference, Speech Understanding, and Understanding, and User Models", In Nineteenth Annual Symposium on Computer Applications in Medical Care, Toward Cost-Effective Clinical Computing, Nov. 1995, 8 Pages.
"International Search Report Issued in PCT Patent Application No. PCT/US00/20685", dated Sep. 29, 2003, 7 Pages.
"International Search Report Issued in PCT Patent Application No. PCT/US01/10394", dated Jun. 13, 2002, 5 Pages.
"International Search Report Issued in PCT Patent Application No. PCT/US01/32543", dated Oct. 27, 2003, 3 Pages.
Zenel, et al., "A General Purpose Proxy Filtering Mechanism Applied to the Mobile Environment", In Proceedings of the Third Annual Acm/IEEE International Conference on Mobile Computing and Networking, Sep. 1997, pp. 248-259.
"Non-final Office Action Issued in U.S. Appl. No. 12/165,377", dated Feb. 19, 2010, Filed Date: Jun. 30, 2008, 12 Pages.
Joachims, Thorsten, "Text Categorization with Support Vector Machines: Learning with Many Relevant Features", In Proceedings of the 10th European Conference on Machine Learning, Apr. 21, 1998, pp. 137-142.
Leonhardt, et al., "Multi-Sensor Location Tracking", In Proceedings of the Fourth Annual ACM/IEEE International Conference on Mobile Computing and Networking, Oct. 1998, pp. 203-214.
Losee, Robert M., Jr., "Miniminizing Information Overload: The Ranking of Electronic Messages", In Journal of Information Science, vol. 15, Issue 3, Jun. 28, 1989, 17 Pages.
Mott, et al., "A Formalism for Context Mediation Based on Feature Logic", In International Journal of Cooperative Information Systems, vol. 8, Issue 4, Dec. 1999, 11 Pages.
"Non-final Office Action Issued in U.S. Appl. No. 11/179,822", dated Aug. 1, 2008, Filed Date: Jul. 11, 2005, 14 Pages.
"Non-final Office Action Issued in U.S. Appl. No. 11/761,210", dated Nov. 28, 2008, Filed Date: Jun. 11, 2007, 6 Pages.
"Non-final Office Action Issued in U.S. Appl. No. 09/981,320", dated Dec. 3, 2008, Filed Date: Oct. 16, 2001, 23 Pages.
"Non-final Office Action Issued in U.S. Appl. No. 10/984,511", dated Jul. 29, 2008, Filed Date: Nov. 8, 2004, 17 Pages.
"Non-final Office Action Issued in U.S. Appl. No. 09/894,642", dated Sep. 17, 2008, Filed Date: Jun. 27, 2001, 16 Pages.
"Final Office Action Issued in U.S. Appl. No. 10/981,941", dated Aug. 14, 2008, Filed Date: Nov. 5, 2004, 12 Pages.
"Non-Final Office Action Issued in U.S. Appl. No. 11/567,902", dated Dec. 4, 2008, Filed Date: Dec. 7, 2006, 9 Pages.
"Non-Final Office Action Issued in U.S. Appl. No. 11/559,854", dated Jan. 2, 2009, Filed Date: Nov. 14, 2006, 15 Pages.
"Non-Final Office Action Issued in U.S. Appl. No. 11/490,540", dated Oct. 30, 2008, Filed Date: Jul. 19, 2006, 22 Pages.
"Non-Final Office Action Issued in U.S. Appl. No. 11/033,974", dated Sep. 15, 2008, Filed Date: Jan. 11, 2005, 13 Pages.
Ockerbloom, John, "Mediating Among Diverse Data Formats: Thesis Summary", Ph D Thesis, Technical Report CMU-CS-98-102, Department of Computer Sciences, Carnegie Mellon University, Jan. 14, 1998, pp. 1-14.
Ockennnan, et al., "Wearable Computers for Performance Support: Initial Feasibility Study", In IEEE International Symposium on Wearable Computers, Oct. 1997, pp. 10-17.
Papakonstantinou, et al., "MedMaker: A Mediation System Based on Declarative Specifications", In IEEE 29th International Conference on Data Engineering, Feb. 1996, 10 Pages.
Pascoe, Jason, "Adding Generic Contextual Capabilities to Wearable Computers", In Proceedings of the Second IEEE International Symposium on Wearable Computers, Oct. 1998, 8 Pages.
Rhodes, et al., "Remembrance Agent: A Continuously Running Automated Information Retrieval System", In First International Conference on the Practical Application of Intelligent Agents and Multi Agent Technology, Apr. 1996, 4 Pages.
Rosis, et al., "Adaptive Interaction with Knowledge-Based Systems", In Proceedings of the Workshop on Advanced Visual Interfaces, Jun. 1994, pp. 192-199.
Sawhney, Nitin, "Contextual Awareness, Messaging and Communication in Nomadic Audio Environments", Doctoral Dissertation, Massachusetts Institute of Technology, Jun. 1998, 122 Pages.
Schilit, et al., "Disseminating Active Map Information to Mobile Hosts", In IEEE Network, vol. 8, Issue 5, Sep. 1994, pp. 22-32.
Schilit, et al., "Context-Aware Computing Applications", In First Workshop on Mobile Computing Systems and Applications, Dec. 1994, 7 Pages.
Schilit, et al., "Customizing Mobile Applications", In Proceedings USENIX Symposium on Mobile and Location Independent Computing, vol. 9, Aug. 1993, 9 Pages.
Schilit, et al., "The ParcTab Mobile Computer System", In Proceedings of Fourth Workshop on Workstation Operating Systems, Oct. 1993, pp. 34-39.
Schilit, William Noah, "A System Architecture for Context-Aware Mobile Computing", A PhD Dissertation, Columbia University, Dec. 1995, 153 Pages.
Billinghurst, et al., "Wearable Devices: New Ways to Manage Information", In IEEE Computer, Jan. 1999, pp. 57-64.
Spreitzer, et al., "Providing Location Information in a Ubiquitous Computing Environment", In Proceedings of the Fourteenth ACM Symposium on Operating Systems Principles, Dec. 1993, pp. 270-283.
Spreitzer, et al., "Architectural Considerations for Scalable, Secure, Mobile Computing with Location Information", In Proceedings of the International Conference on Distributed Computing Systems, Jun. 1994, pp. 29-38.
Spreitzer, et al., "Scalable, Secure, Mobile Computing with Location Information", In Communications of the ACM, vol. 36, Issue 7, Jul. 1993, 1 Page.
Starner, Thad Eugene, "Wearable Computing and Contextual Awareness", Massachusetts Institute of Technology, Jun. 1999, 248 Pages.
Starovic, et al., "An Event Based Object Model for Distributed Programming", In International Conference on Object Oriented Information Systems, Dec. 1995, pp. 72-86.
Theimer, et al., "Operating System Issue for PDAs", In Proceedings of the Fourth Workshop on Workstation Operating Systems, Oct. 1993, 7 Pages.
Wachowicz, et al., "Combining Location and Data Management in an Environment for Total Mobility", In Proceedings of the International Workshop on Information Visualization and Mobile Computing, Feb. 1996, 12 Pages.

(56) References Cited

OTHER PUBLICATIONS

Want, et al., "Active Badges and Personal Interactive Computing Objects", In IEEE Transactions on Consumer Electronics, vol. 38, Issue 1, Feb. 1992, pp. 10-20.

Want, et al., "The Active Badge Location System", In ACM Transactions on Information Systems, vol. 10, Issue 1, Jan. 1992, pp. 91-102.

Adowd, et al., "Context-Awareness in Wearable and Ubiquitous Computing", Future Computing Environments, GVU Technical Report GIT-GVU-97-11, Oct. 1997, 13 Pages.

Ni, Y., "Attribute Name Evaluation and its Implementation", Deakin University, School of Computing and Mathematics, May 16, 1994, 32 Pages.

* cited by examiner

AUTOMATED SELECTION OF APPROPRIATE INFORMATION BASED ON A COMPUTER USER'S CONTEXT

CROSS REFERENCE TO RELATED APPLICATIONS

This application is a continuation of U.S. patent application Ser. No. 12/165,377, filed Jun. 30, 2008 and entitled "Automated Selection of Appropriate Information Based on a Computer User's Content", which is a continuation of U.S. patent application Ser. No. 11/435,326, filed May 16, 2006 and entitled "Automated Selection of Appropriate Information Based on a Computer User's Content" (now U.S. Pat. No. 7,395,507), which is a continuation of U.S. patent application Ser. No. 09/835,077, filed Apr. 12, 2001 and entitled "Automated Selection of Appropriate Information Based on a Computer User's Content" (now U.S. Pat. No. 7,073,129), which is a continuation-in-part of U.S. patent application Ser. No. 09/216,193, filed Dec. 18, 1998 and entitled "Method and System for Controlling Presentation of Information to a User Based on the User's Condition" (now U.S. Pat. No. 6,466,232).

U.S. patent application Ser. No. 09/835,077 is also a continuation-in-part of U.S. patent application Ser. No. 09/464,659, filed Dec. 15, 1999 and entitled "Storing and Recalling Information to Augment Human Memories" (now U.S. Pat. No. 6,513,046).

U.S. patent application Ser. No. 09/835,077 is also a continuation-in-part of U.S. patent application Ser. No. 09/825,159, filed Apr. 2, 2001 and entitled "Thematic Response to a Computer User's Context, Such as by a Wearable Personal Computer" (now U.S. Pat. No. 7,076,737), which claims the benefit of provisional U.S. Patent Application No. 60/193,999, filed Apr. 2, 2000 and entitled "Obtaining and Using Contextual Data for Selected Tasks or Scenarios, Such as for a Wearable Personal Computer".

U.S. patent application Ser. No. 09/835,077 is also a continuation-in-part of U.S. patent application Ser. No. 09/824,900, filed Apr. 2, 2001 and entitled "Soliciting Information Based on a Computer User's Context" (now U.S. Pat. No. 6,968,333), which claims the benefit of provisional U.S. Patent Application No. 60/194,000, filed Apr. 2, 2000 and entitled "Soliciting Product Information Based on the User's Context", and provisional U.S. Patent Application No. 60/194,758, filed Apr. 2, 2000 and entitled "Creating Portals Based on the User's Context".

U.S. patent application Ser. No. 09/835,077 also claims the benefit of provisional U.S. Patent Application No. 60/196,625, filed Apr. 12, 2000 and entitled "Enhanced Gaming with Wearable Computers", and of provisional U.S. Patent Application No. 60/240,694, filed Oct. 16, 2000 and entitled "Method for Synchronizing Computer Generated Images with Real World Images".

U.S. patent application Ser. Nos. 12/165,377, 09/216,193, 09/464,659, 09/825,159, and 09/824,900 and provisional U.S. Patent Application Nos. 60/193,999, 60/194,000, 60/194,758, 60/196,625, and 60/240,694 are hereby incorporated by reference in their entireties.

TECHNICAL FIELD

The present invention relates generally to computer-supported filtering of information, and more particularly to presentation of filtered information (such as unsolicited advertisements) to a computer user based on the user's current context.

BACKGROUND

As computers become increasingly powerful and ubiquitous, users increasingly employ their computers for a broad variety of tasks. For example, in addition to traditional activities such as running word processing and database applications, users increasingly rely on their computers as an integral part of their daily lives. Programs to schedule activities, generate reminders, and provide rapid communication capabilities are becoming increasingly popular. Moreover, computers are increasingly present during virtually all of a person's daily activities. For example, hand-held computer organizers (e.g., PDAs) are more common, and communication devices such as portable phones are increasingly incorporating computer capabilities. Thus, users may be presented with output information from one or more computers at any time.

Accompanying the increasing use and portability of computers is an increasing desire to provide information to users through wireless and other communication channels. Advertisers are particularly interested in reaching computer users as such users often represent desirable target markets. Advertisers would like to provide advertisements to various computer and communication devices that are relevant to the users. Other groups in addition to advertisers may also want to disseminate information to computer users.

With the convergence of computerization, wireless capabilities, digitalization, and ease of dissemination, the amount of potential information that may be bombarded on individual users may prove too overwhelming. The sheer volume of information may prevent or discourage computer users from making any effort to examine the information and find what is immediately desirable or necessary. However, simply reducing the amount of information, or the number of information sources, is not an appropriate solution because the user loses access to information of potential interest.

In general, current solutions for selecting incoming information fail because they do not address the dynamic, immediate, and arbitrary desires and needs of a user. The solutions cannot be easily modified, extended, or shared by the user.

One possible solution is to simply ignore some or all available information, such as unsolicited information that is received. This solution is not always possible, however, and is often difficult and inconvenient. For example, it is difficult to ignore an audio message of moderate volume, especially when those messages are specifically designed to be difficult to ignore (e.g., by compressing the dynamic range so that the average volume is higher). Plus, rejecting all information robs the user of potentially important information in which the user may be interested.

Another solution is to select a set of information sources from which information (solicited and/or unsolicited) is permitted. This exclusionary practice is not fully desirable because the user loses access to potentially desirable information from a source that may not be on the acceptable source list. Also, even with a small number of information sources, the user's ability to give continuous attention to multiple, or even a single information source, is limited. This is especially true if the user is to remain "in task" and not be distracted by inappropriate information. Junk mail filters used by conventional email programs attempt to filter unwanted bulk mailings by using keywords or user enumeration. These filters have the drawback in that the user must manually update desired or undesired sources to account for new sources.

Another drawback of conventional solutions is that the solutions are based on the underlying assumption that the user is stationary and in a static context, such as sitting at a desktop computer or sitting in front of a web-enabled television. The solutions do not take into account that the user's context may be dynamic and changing or evolving over time. Thus, the present-day solutions for filtering digital information are not easily ported to the portable computing environment such as portable computing devices, PDAs, communications devices, and wearable computing devices.

Users, on the other hand, may not mind receiving even unsolicited information (e.g., advertisements) if the information is received at a convenient time and made available in a non-intrusive manner. Much of this timing and convenience is dictated by the user's current context. The user's context can either limit or enhance their ability and desire to receive and process information. When the user is not interested in receiving a message, or the user is unable to receive a specific message because they are too busy, or the user is unable to accept a specific message due to the user's present environment or situation (such as the user's current information presentation system configuration), the context may simply dictate that the user is not interested or able to review any information.

Accordingly, there is a need for improved techniques that enable received information, including unsolicited information, to be received and presented in a timely and relevant manner to the computer user. Such techniques would be desirable for the user because the user will be made aware of potentially relevant information and beneficial for the information provider (such as an advertiser) because the user may not be as apt to simply ignore or discard the information. Instead, the user may want to experience (e.g. see, hear, smell, etc.) the advertisement when the user's context is suitable for reviewing the advertisement.

In addition to the general need for improved techniques to select appropriate information and present it in an appropriate manner, there are various specialized environments or situations which harbor additional problems or constraints. For example, existing computer games don't provide a complete gaming environment that reflects the user's detailed context, such as can be maintained or modeled by the user's characterization module. Thus, there is a need for computer games to provide enhanced functionality by using such modeled context information, such as to select appropriate game-related information or functionality based on the user's context and to present it in an appropriate manner.

In addition, in the area of computer-based augmented reality, there is a need for improved techniques to select appropriate information and present it in an appropriate manner. In particular, current technology is unable to dynamically augment reality by integrating virtual information (such as images, sounds, and other related information) with real world information (e.g., visible objects and audible sounds) without hardware clues. Maintaining an overlay, or visual mapping, of virtual objects on top of real-world objects is known as registration. For example, in an industrial setting an example of registration may involve superimposing a virtual image of a wire over the real-world view of the wire, and having that virtual wire remain properly associated with the real wire while the user's head is moving. Such registration can be facilitated by adding visual clues to the relevant environment, such as patterns of dots on a circuit board containing the wire. However, the need for such visual cues severely limits the usability of augmented reality. Another difficulty in managing the overlay of virtual information onto the real world involves presenting and formatting computer interactions controls without detracting from the user's experiencing of the real world.

DETAILED DESCRIPTION

Figure 1:
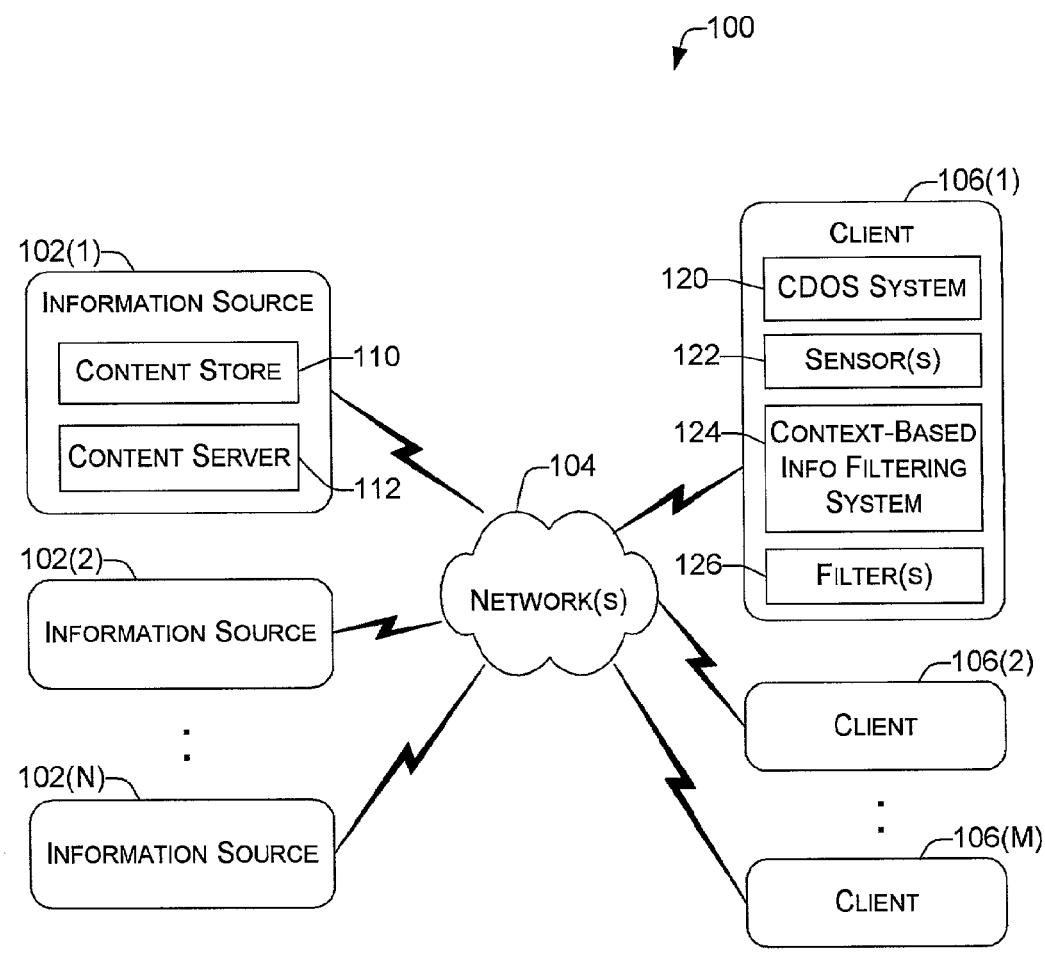
FIG. 1 illustrates a system in which messages are pushed from multiple information sources to multiple clients over a network.

This disclosure pertains to techniques for filtering received information based on the user's current context in order to determine whether the information is appropriate for presentation to the user. In some embodiments, the received information is unsolicited information, such as advertisements. Using an explicit, dynamic, extensible software model of a user's context, such as one that represents their desires, needs, physical condition, surrounding environment, computing capabilities, and data receiving capabilities, information that is appropriate for the user can be determined. In some embodiments, additional determinations are made as to how, when and/or where such appropriate information should be presented, and the information can then be presented in the appropriate determined manner.

In order to use context information about the user to make appropriate determinations, such context information must be received or generated. In some embodiments, various environmental aspects (e.g., mental, physical, computing, data, etc.) are monitored, and a current context of the user is modeled. In other embodiments, such information is received from other sources that perform the monitoring and/or the modeling. Such context information can be represented in various forms, such as with a variety of context attributes (or "condition variables") that each model a single aspect of the context (e.g., ambient temperature, current latitude, or current user task). In some embodiments, context attributes are used that each have a name and at least one value, and can additionally have other properties such as uncertainty, units and timestamp.

When the context information is available, it can then be used to define a set of one or more filters to be selectively applied to incoming information, such as messages. Each filter can have different filter criteria, and a composite of multiple filters can also be used. Since the user's context is typically non-static and continually evolving, the set of filters currently in use can be updated as the context changes.

Information that satisfies the filter criteria of the current filters is determined to be currently appropriate for presentation, although current presentation of such information may not be appropriate (e.g., current sports news may be appropriate information for a particular user, but presentation of such information may not be appropriate while the user is driving or in a business meeting). Thus, in some embodiments, information that is determined to be appropriate based on the current filters is then evaluated to determine whether it should be presented to the user immediately or instead stored for later presentation. In addition, determinations can be made such as where (e.g., on what device) and how (e.g., via which user senses or with what degree of prominence) the information should be presented. As with selection of filters, the user's context can be used in making the determinations of when, where and how to present the content.

Exemplary System

FIG. 1 shows a system 100 in which multiple information sources 102(1), 102(2), . . . 102(N) transmit information over one or more networks 104 to multiple clients 106(1), 106(2), . . . 106(M). Information that is unsolicited by the clients is said to be "pushed" from the information sources 102 to the clients 106, while information that is solicited or requested is said to be "pulled" by the clients. While it is particularly important to analyze unsolicited information for appropriateness before presentation (since the client or user to whom the information is being pushed has typically not previously indicated any level of interest in the information), it can also be beneficial to analyze solicited information for appropriateness since the actual information that is received may be different than what the user thought they were requesting and/or since it may still be useful to determine an appropriate manner (e.g., when, where and how) in which to present the information. While most of the techniques described below are generally applicable to both solicited and unsolicited information, some disclosed techniques emphasize the analyzing of unsolicited information. Conversely, additional techniques that focus primarily on active requesting of information from sources and corresponding analyzing of such information can be found in U.S. patent application Ser. No. 09/824,900, filed Apr. 2, 2001 and entitled "Soliciting Information Based On A Computer User's Context" (now U.S. Pat. No. 6,968,333).

The information sources 102 may be implemented in a number of ways, such as a host server at a Website, an email service, a paging service, a financial quote service, a cellular communications host, a radio transmission unit, and the like. As one exemplary implementation, an information source, as represented by source 102(1), may include a content store 110 to store the information and a content server 112 to serve the content to the clients 106. The information communicated from the information sources may be in any data type (e.g., text, graphics, audio, software executables, video, etc.) and contain essentially any type of subject matter. Examples of possible information that may be pushed to the clients include streaming media, safety bulletins, future or current event announcements, environment status (weather, traffic), local vicinity status (elevator wait time), object status (where is my bus?), executable code, object descriptors (any computer-compatible enumeration or description of sensors or peripheral devices). As one particular example, the information may be in the form of unsolicited advertisements pushed to the clients 106 from advertisers.

The network 104 is representative of many different network types, including public networks (e.g., the Internet) and proprietary networks. The network may be implemented using wireless technologies (e.g., RF, microwave, cellular, etc.), wire-based technologies (e.g., cable, fiber optic, wire, etc.), or any combination. Any one of many diverse protocols and formats may be used to package data and transmit it from the source 102 to the client 106.

The clients 106 may be implemented in a variety of ways, including as computers, portable digital assistants (PDAs), communication devices, and the like. The clients are equipped with conventional mechanisms to receive the information from the network 104, such as ports, network cards, receivers, modems, and so on. As described in greater detail below, in some embodiments some or all of the clients may be wearable computers.

Each client in the illustrated embodiment, as represented by client 106(1), is equipped with a Condition-Dependent Output Supplier (CDOS) system 120 that monitors the user and the user's environment and that creates and maintains a model (not shown) of the user's context (or "condition"). As the user moves about in different environments, the CDOS system receives various input information, including explicit user input, sensed user information, and sensed environment information. In the illustrated embodiment, one or more sensors 122 provide data to the CDOS system pertaining to the user's environment.

Each client 106 is also equipped with a context-based information filtering system 124 that utilizes one or more filters 126 to selectively pass/block information from the information sources 102 based on the user's present context. Depending on many factors of the user's current context, the context-based information filtering system 124 may allow certain received information, such as important messages from a spouse or family member, to pass through while concurrently blocking other information. Depending on the user's context, the information determined to be appropriate may then be presented immediately or instead stored for delayed presentation.

Exemplary Client

Figure 2:
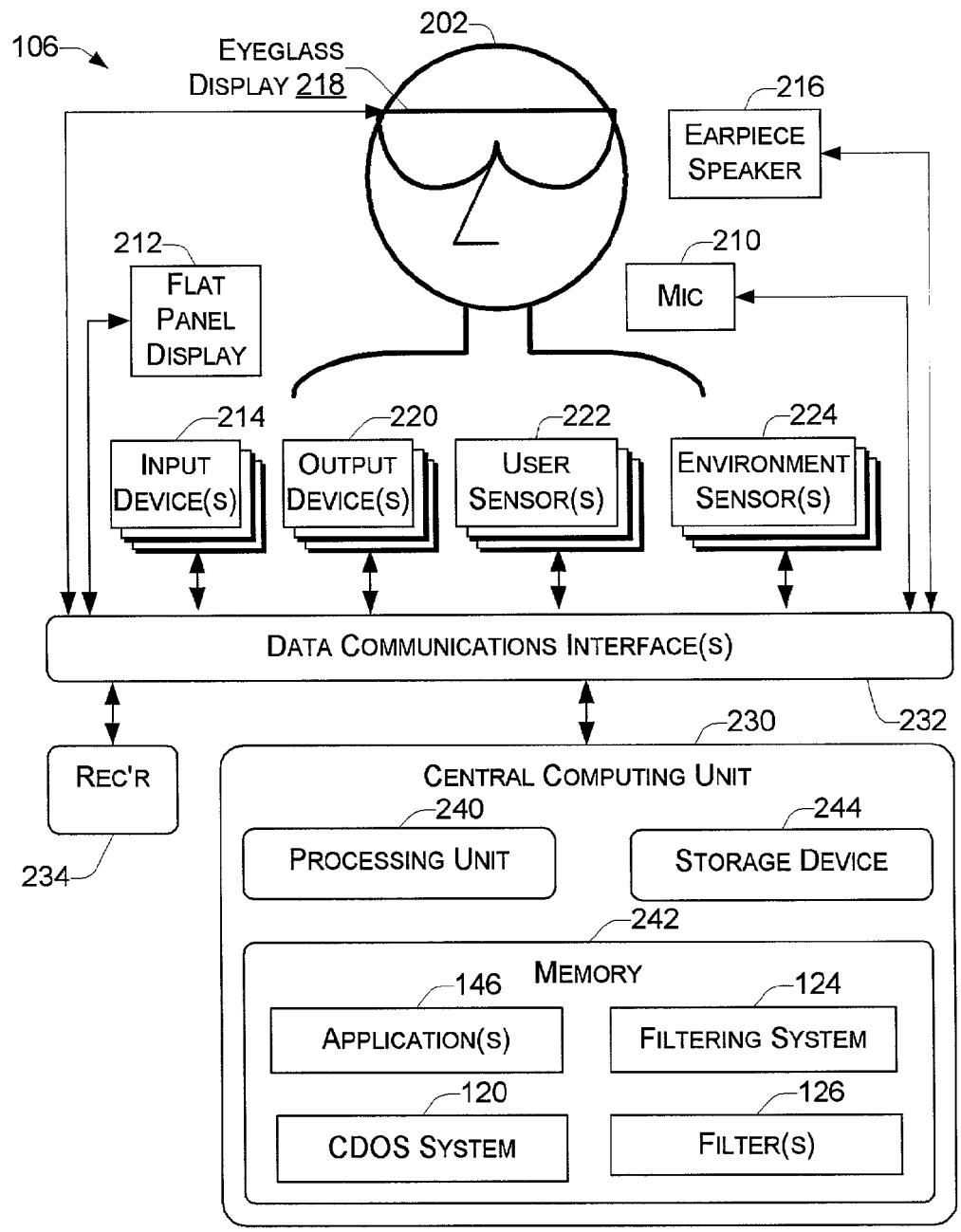
FIG. 2 illustrates one exemplary implementation of a client, which is embodied as a wearable computer.

FIG. 2 illustrates one suitable implementation of client 106 as a body-mounted wearable computer worn by a user 202. The computer 106 includes a variety of body-worn input devices, such as a microphone 210, a hand-held flat panel display 212 with character recognition capabilities, and various other user input devices 214. Examples of other types of input devices with which a user can supply information to the computer 106 include speech recognition devices, traditional qwerty keyboards, chording keyboards, half qwerty keyboards, dual forearm keyboards, chest mounted keyboards, handwriting recognition and digital ink devices, a mouse, a track pad, a digital stylus, a finger or glove device to capture user movement, pupil tracking devices, a gyropoint, a trackball, a voice grid device, digital cameras (still and motion), and so forth.

The computer 106 also has a variety of body-worn output devices, including the hand-held flat panel display 212, an earpiece speaker 216, and a head-mounted display in the form of an eyeglass-mounted display 218. Other output devices 220 may also be incorporated into the computer 106, such as a tactile display, other tactile output devices, an olfactory output device, and the like.

The computer 106 may also be equipped with one or more various body-worn user sensor devices 222. For example, a variety of sensors can provide information about the current physiological state of the user and about current user activities. Examples of such sensors include thermometers, sphygmometers, heart rate sensors, shiver response sensors, skin galvanometry sensors, eyelid blink sensors, pupil dilation detection sensors, EEG and EKG sensors, sensors to detect brow furrowing, blood sugar monitors, etc. In addition, sensors elsewhere in the near environment can provide information about the user, such as motion detector sensors (e.g., whether the user is present and is moving), badge readers, still and video cameras (including low light, infrared, and x-ray), remote microphones, etc. These sensors can be both passive (i.e., detecting information generated external to the sensor, such as a heart beat) and active (i.e., generating a signal to obtain information, such as sonar or x-rays).

The computer 106 may also be equipped with various environment sensor devices 224 that sense conditions of the environment surrounding the user. For example, devices such as microphones or motion sensors may be able to detect whether there are other people near the user and whether the user is interacting with those people. Sensors can also detect environmental conditions that may affect the user, such as air thermometers or Geiger counters. Sensors, either body-mounted or remote, can also provide information related to a wide variety of user and environment factors including location, orientation, speed, direction, distance, and proximity to other locations (e.g., GPS and differential GPS devices, orientation tracking devices, gyroscopes, altimeters, accelerometers, anemometers, pedometers, compasses, laser or optical range finders, depth gauges, sonar, etc.). Identity and informational sensors (e.g., bar code readers, biometric scanners, laser scanners, OCR, badge readers, etc.) and remote sensors (e.g., home or car alarm systems, remote camera, national weather service web page, a baby monitor, traffic sensors, etc.) can also provide relevant environment information.

The computer 106 further includes a central computing unit 230. The various inputs, outputs, and sensors are connected to the central computing unit 230 via one or more data communications interfaces 232 that may be implemented using wire-based technologies (e.g., wires, coax, fiber optic, etc.) or wireless technologies (e.g., RF, etc.). A receiver 234 is designed to receive incoming messages from the network 104 and to pass them to the central computing unit 230 via the data communications interfaces 232. The receiver 234 may be implemented in a number of ways, including as an RF receiver, a microwave receiver, a satellite receiver, a network card, a wireless network card, a modem, and so forth.

The central computing unit 230 includes a central processing unit (CPU) 240, a memory 242, and a storage device 244. The memory 242 may be implemented using both volatile and non-volatile memory, such as RAM, ROM, Flash, EEPROM, disk, and so forth. The storage device 244 is typically implemented using non-volatile permanent memory, such as ROM, EEPROM, diskette, memory cards, and the like.

One or more application programs 246 can be optionally stored in memory 242 and executed by the CPU 240. These application programs generate information that may be presented to the user via one or more of the output devices.

In the illustrated implementation, a CDOS system 120 is shown stored in memory 242 and executing on the processing unit 240. The CDOS system 120 monitors the user and the user's environment, and creates and maintains an updated model of the current context of the user. As the user moves through different environments, the CDOS system receives various input information including explicit user input, sensed user information, and sensed environment information. The CDOS system updates the current model of the user condition, and presents output information to the user via appropriate output devices. A more detailed explanation of the CDOS system 120 may be found in U.S. patent application Ser. No. 09/216,193 (now U.S. Pat. No. 6,466,232), and a more detailed discussion of context attributes (or condition variables) may be found in U.S. patent application Ser. No. 09/724,902 (now U.S. Pat. No. 7,231,439).

The context-based information filtering system 124 is also shown stored in memory 242 and executing on the processing unit 240. It utilizes data from the modeled user context (e.g., via the CDOS system 120) to selectively filter information according to the user's current environment in order to determine whether the information is appropriate for presentation. The filtering system 124 employs one or more filters 126 to filter the information. The filters may be pre-constructed and stored for subsequent utilization when conditions warrant their particular use, or alternatively the filtering system 124 may construct the filters dynamically as the user's context evolves. In addition, in some embodiments each filter is stored as a distinct data structure (optionally with associated logic), while in other embodiments filters can be provided as logic based on the current context, such as one or more interacting rules provided by the filtering system or CDOS system.

The body-mounted computer 106 may be connected to one or more networks through wired or wireless communication technologies (e.g., wireless RF, a cellular phone or modem, infrared, physical cable, a docking station, etc.). For example, the body-mounted computer of a user could make use of output devices in a smart room, such as a television and stereo when the user is at home, if the body-mounted computer can transmit information to those devices via a wireless medium or if a cabled or docking mechanism is available to transmit the information. Alternately, kiosks or other information devices can be installed at various locations (e.g., in airports or at tourist spots) to transmit relevant (and typically, unsolicited) information to body-mounted computers within the range of the information device.

It is noted that the body-mounted computer 106 is merely one example of a suitable client computer. There are many other implementations of client computing devices that may be used to implement the context-based information filtering system. In addition, while the computer 106 is illustrated in FIG. 2 as containing various computing and storage resources and associated I/O devices, in other embodiments a computer 106 may act as a thin client device that receives some or all of its computing and/or storage capabilities from a remote server. Such a thin client device could consist only of one or more I/O devices coupled with a communications mechanism with which to interact with the remote server.

Thus, those skilled in the art will appreciate that computer systems 106 are merely illustrative and are not intended to limit the scope of the present invention. Such computer systems may be connected to other devices that are not illustrated, including through one or more networks such as the Internet or via the World Wide Web (WWW). In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while items (e.g., filters and software components) are illustrated as being stored in memory while being used, these items or portions of them can be transferred between memory and other storage devices for purposes of memory management and data integrity. Similarly, items illustrated as being present on storage while being used can instead be present in memory and transferred between storage and memory. Alternately, in other embodiments some or all of the software modules may execute in memory on another device. Some or all of the described components or data structures may also be stored (e.g., as instructions or structured data) on a computer-readable medium (e.g., a hard disk, a memory, a network, or a portable article to be read by an appropriate drive), and can be transmitted as generated data signals (e.g., as part of a carrier wave) on a variety of computer-readable transmission mediums (e.g., wireless-based and wired/cable-based mediums). In addition, a "client" or "server" computing device may comprise any combination of hardware or software that can interact, including computers, network devices, internet appliances, PDAs, wireless phones, pagers, electronic organizers, television-based systems and various other consumer products that include inter-communication capabilities. Accordingly, the present invention may be practiced with other computer system configurations.

Context-Based Information Filtering System

Figure 3:
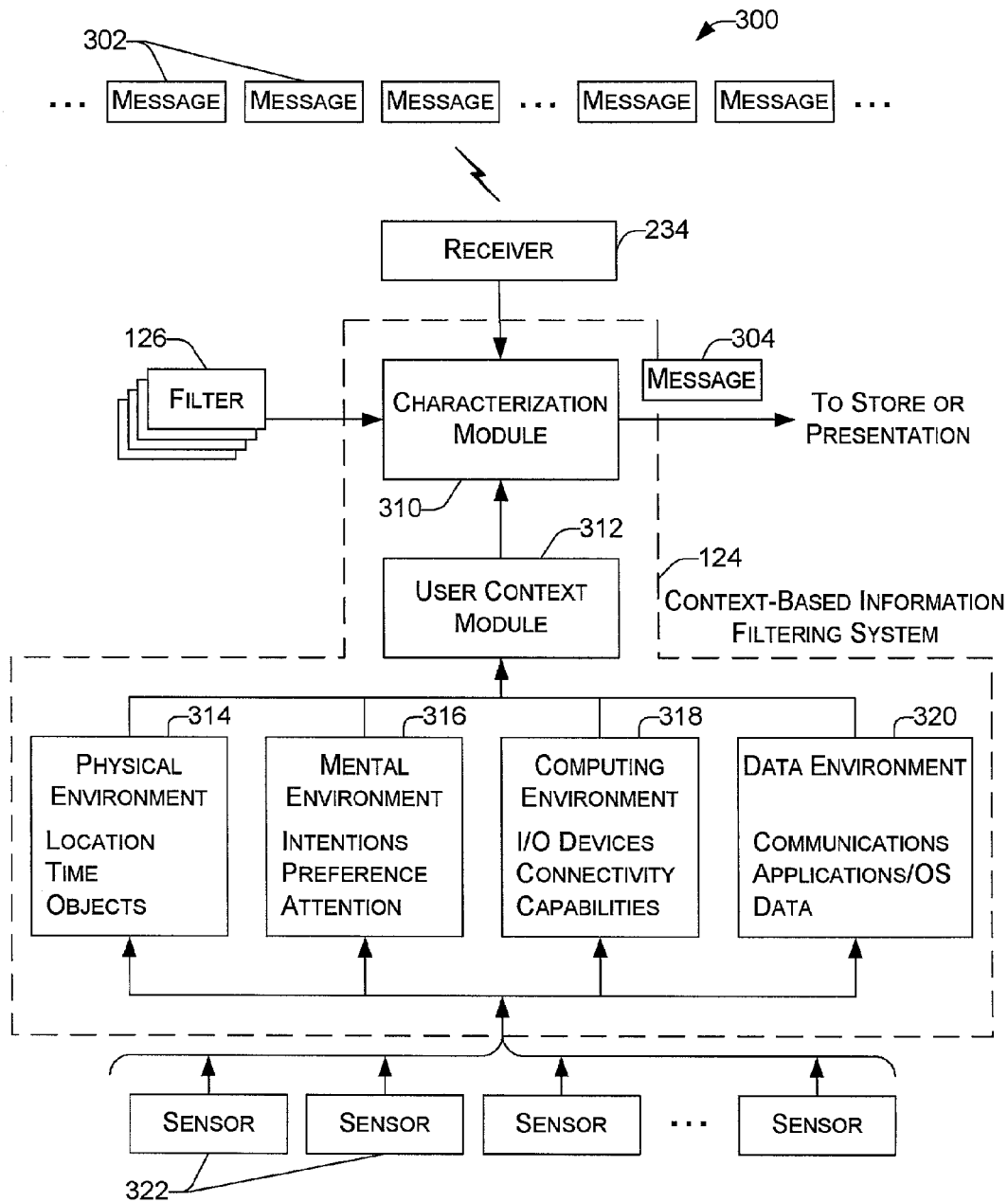
FIG. 3 illustrates an architecture implemented at the client to filter incoming messages according to the user's context.

FIG. 3 illustrates one exemplary architecture 300 in which the context-based information filtering system 124 may be implemented. The architecture includes several functional components that filter information (e.g., unsolicited information such as advertisements) based on the user's context before allowing that information to be presented to the user.

According to architecture 300, incoming messages are received at a Receiver 234 from a communications network. In some embodiments, the Receiver is a hardware device, while in other embodiments the Receiver could be an application program such as a Web browser. There are a wide variety of messages originating from a number of different sources, including directed messages like telephone and fax calls, email messages, instant messaging, broadcast messages like TV and radio, multicast or streaming messages, etc. Messages can also be computer generated (e.g., from an application program), either remotely or locally. While the illustrated embodiment discusses the analysis of incoming messages, other information that is less structured than messages can also be filtered in a similar manner, such as ambient conversations or visual information of an objectionable nature.

The context-based information filtering system 124 applies one or more filters 126 to incoming messages 302. The filters 126 may be designed and stored as separate from the filtering system or instead integrated within the system. Moreover, the filters may reside at the client or instead be remote from the client, such as in the distributed system described below with respect to FIG. 6. Individual filters may be static in that they are pre-configured for particular usage and stored in the client's computer memory for retrieval by the filtering system 124. Alternatively, individual filters may be generated dynamically by the filtering system 124 as user conditions dictate, such as by applying logic associated with the filtering system or the CDOS system. For instance, if the user is currently sleeping and the computer system detects the user is in a sleep state, the filtering system 124 may generate a temporary filter that blocks all but the highest important incoming messages. Those skilled in the art will appreciate that such a temporary filter may not be stored as a distinct data structure, but instead reflect processing logic/functionality provided by one of the components.

The filters are designed with two competing goals in mind: (1) precision-receiving only messages that are appropriate to the desire, situation and needs of the user, and (2) completeness-making sure that nothing of interest is missed. The filters 126 can also be general or very specific. For example, one filter may be configured to accept advertisements from soft-drink advertisers, while another filter may be configured to block diet soft-drink advertisements. More specifically, a filter may accept advertisements for a specific cola, but prevent advertisements from a competitive cola product. Thus, if the user only drinks Coca-Cola® brand cola, an advertiser may pay for access to users who never purchase a Pepsi-Cola® brand cola and those constraints could be configured into a specific filter. That filter may also specify an incentive level that an advertiser of a Pepsi-Cola® brand product may need to pay or otherwise provide in order to purchase the privilege of presenting a Pepsi-Cola® brand advertisement to the user who typically only drinks Coca-Cola® brand cola. The incentive level may even be variable for different users. As a way to purchase that privilege, the advertising company may provide coupons to the user or pay the user for simply viewing the advertisement.

Messages that survive the filters 126 are either presented to the user at that time or stored in the client computer for delayed presentation. This is represented by accepted message 304 that has survived the filters 124 and is being forwarded for the user's attention.

The illustrated embodiment of the context-based information filtering system 124 includes a characterization module 310 that attempts to characterize the user's current context and apply the appropriate filters 126 to the incoming messages 302 received at receiver 234. The characterization module 310 also provides information about the user's current context that facilitates the determination of whether the acceptable message(s) should be stored or presented immediately to the user. Whether the messages received at receiver 234 are first passed to the characterization module 310 or to the filters 126 is a matter of design choice. The messages may be first passed to the characterization module 310 and then subjected to the various filters 126 (as shown in FIG. 3). Alternatively, the filters selected by the filtering system may intercept and filter the messages before they are passed onto the characterization module 310.

The context-based information filtering system 124 can be configured to characterize and filter any information that is analyzable by a computing device. The precision of the filtering is in part determined by how much information about the information is available. At a minimum, the system can use characteristics that can be inferred from the information itself, such as message characteristics for received messages. Examples of such message characteristics include the following:

source—a type or instance of carrier, media, channel or network path;
    destination—address used to reach the user (e.g., a user typically has multiple address, phone numbers, etc.);
    content of the message (parsable or described in metadata);
    data format type;

arrival time;
size; and/or
previous messages-inference based on examination of log of actions on similar messages.

In addition, many message formats explicitly include message-characterizing information, which can provide additional filtering criteria. Examples of message-characterizing information includes the following:
title;
originator identification (e.g., email author);
origination date & time;
routing (e.g., email often shows path through network routers);
priority;
sensitivity—security levels and permissions;
encryption type;
file format—might be indicated by file name extension;
language—may include preferred or required font or font type;
other recipients (e.g., email cc field); and/or
required software.

Moreover, the information source may add any additional kind of characterizing metadata to the messages, and such metadata can be used to determine message appropriateness. Examples of such metadata include the following:
offer characteristics—a solicitation for goods or services can include an explicit description of the offer, such as specific product attributes like size, color, materials, cost, availability, warranty, external reviews, etc. with adequate detail, messages can be presented to the user corresponding with a narrowly defined user context;
sender characteristics—their context can include arbitrary attributes (mood, location, who they are in presence of);
certification—a trusted indication that the offer characteristics are dependable and accurate; and/or
recommendations—outside agencies can offer opinions on what information may be appropriate to a particular type of user or situation.

In the illustrated embodiment, the characterization module 310 characterizes the user's context based on information received from a user context module 312. Information pertaining to the user's environment is captured and passed to the user context module 312 for analysis. The user context module 312 creates, maintains, and updates one or more models pertaining to the user's context that integrate multiple areas of a human's computerized environments, such as physical, mental, computing, and data. In the illustrated implementation, the user context module 312 gathers information on (1) the user's physical environment from module 314, (2) the user's mental environment from module 316, (3) the user's computing environment from module 318, and (4) the user's data environment from module 320. Various sensors 322 (e.g., environment sensors 224, user sensors 222, etc.) monitor the environment parameters and provide data to the modules 314-320.

The physical environment module 314 generates information pertaining to the user's present location (e.g., geographical, relative to a structure such as a building, etc.), the current time, and surrounding objects within a perceivable proximity that may interfere or distract the user from focusing attention on the incoming messages. Other possible information related to the physical environs include people, user's body state, or anything that can be externally sensed by computer-connected transducers or inferred by examining other parts of the context model. As an example, a user with a wearable computer may be traversing through a structure that is very dark and cold and that requires full visual and auditory senses on the surrounding objects within the structure. While in this state, the user most likely does not want to receive an advertisement for a sale on sunglasses.

The mental environment module 316 generates information pertaining to the user's likely intentions, their preferences, and their level and quality of attention. Other information may include mood, topic of conversation, or any self-characterization that is meaningful to the user, provided by an observer, or inferred by examining other parts of the context model. For instance, the mental environment module 3 16 may use data from a pupil tracking sensor or head orientation sensor to identify a direction or object on which the user is focused. If the user appears to be focused on administrative items presented on a heads-up display, then the user context module 312 might determine that it is safe to present a message. Another example is to use preference metrics programmed by the user to differentiate among the urgency of certain incoming messages. For instance, the user might specify that all messages from his family are highly important, whereas all messages from a book retailer are marked with the lowest level of importance. Filters could then filter messages based on these defined importance levels.

The computing environment module 318 generates information pertaining to the computing capabilities of the client, including available I/O devices (e.g., keyboards, buttons, microphones, cursor controllers (such as rolling, pointing, pressing, bending, turning, twisting, switching, rubbing, zipping controllers), displays, speakers, pressure devices, etc.), connectivity (e.g., amount of bandwidth, security level, cost, strength, protocol, quality, media type, schedule, etc.), processing capabilities, available storage space, and anything else that the local and remote computing environment can self-characterize. The data environment 320 generates information pertaining to the data and software resources on the client computer, including the communication resources, applications, operating system, and data.

The user context module 312 takes the information generated by the environment modules 314-320 and generates a cohesive set of user conditions based on one or more context models. The model(s) can be broad, dynamic, explicit, and capable of being understood by arbitrary software modules. Here, the set of conditions are provided to the characterization module 310 which is able to comprehend those conditions. Alternatively, the architecture could support a dictionary that may be accessed by any module wanting to understand the meaning of a specific attribute or condition produced by the models.

The characterization module 310 uses the conditions to identify a set of one or more filters to apply to the incoming messages 302. The set of filters is dynamic and can be changed as the user's conditions change. New filters are added or created, while others are dropped as the user's context evolves. For example, in some embodiments each filter could specify a set of one or more context model attributes, and include for each of the specified attributes one or more possible values for the attribute. Such a filter would be selected as matching the current modeled context (and thus used to apply to incoming messages) only if all the specified attributes have current values in the modeled context that are one of their possible values. Alternately, each specified attribute could includes an indication of whether it is required, and in such embodiments the filter can still match the current context even if the current values for non-required attributes do not match the specified possible values. Filters could also specify inter-attribute logic.

As described in greater detail in U.S. patent application Ser. No. 09/825,159, filed Apr. 2, 2001 and entitled "Thematic Response To A Computer User's Context, Such As By A Wearable Personal Computer" (now U.S. Pat. No. 7,076,737), multiple themes can also be defined for a user and used to present appropriate information and functionality. In some embodiments, filters used to analyze incoming messages or other information can each be associated with one or more defined themes, and the filters selected for current use can be one or more of the filters that are associated with one or more of the themes that are determined to match the current context.

In one implementation, the filters 126 each specify criteria to be matched against the content in the incoming messages 302. The messages are selectively allowed or blocked depending on whether the content matches the filter criteria. The messages themselves may be constructed with only the content (e.g., product or service information in an advertisement), and if so the filter or characterization module parses the message for key content to match against the filter criteria. As an example, the message may be a text or radio message that touts a particular product, and the filter or characterization module could parse the message using a text parser or a speech recognition module to identify the product name, type, cost, and so forth.

Alternatively, the information source may supply metadata to aid the filtering and thus avoid the parsing of the messages. In addition, the source-provided metadata can further describe the most appropriate use of the message by characterizing the intended or preferred message recipient's by including target context attribute value ranges. Those skilled in the art will appreciate that in some embodiments the use of such source-provided information may be limited to sources and/or messages that are trusted (e.g., on the basis of being certified by an independent third-party) and/or the system could take additional steps to verify the accuracy of the source-provided information.

The message contents or metadata (from the parser or the source) is then compared to the filter criteria of the currently selected filters. In this way, the filters can act as a proxy for the user's current situation and preferences in order to determine whether messages are appropriate, and thus should be blocked or kept. The characterization module 310 may further examine the context data to determine whether to save the messages for later or pass them onto the user immediately. Message filtering can thereby be accurately and generally based on context parameters that model and evaluate whether messages are appropriate under a set of circumstances.

The characterization module 310 may utilize various characterization models to implement the filter comparisons. One way to characterize messages is to assign a numeric value to a set of message attributes and then compare that numeric value to a table of minimum necessary values or combination of values in order to determine whether a particular message is suitable under the circumstances. An example set of message attributes includes the following:

Message Desirability/Appropriateness—This attribute examines whether message conforms to enumerated or inferred criteria in the filters. For example, a filter might present only the high-priority messages from work-related contacts when the user's context model indicates that they are not working. As another example, the user may specify types of message as desired, such as any information on a particular product or tickets to a concert. These explicitly stipulated characteristics could be used to present only solicitations for the specified product or tickets. Such criteria may also be inferred, such as whether the user's sex, height, or weight has a bearing on a piece of clothing he/she might be interested in purchasing. Also, the characterization module may indicate past preferences regarding purchase decisions, like brand of product, store from which the product was purchased before, and so forth.

Message Need—This attribute helps determine that a message should be presented even though there is no corresponding interest characterization. For example, a message concerning the safety of a product, or a hazard to the safety and health of the user may be deemed appropriate to present.

Urgency—This attribute assists in determining whether messages should be presented immediately, or after some delay.

Sensitivity & Required Privacy

User's Available Attention

Consider the following examples of how the filtering system 124 might operate. Suppose an unsolicited advertisement for a cooling drink is received at the client. The user context module 312, either in response to the advertisement or as a part of separate processing, determines whether the user is thirsty based on various environment data and physiological state information. For example, the user's temperature, the surrounding temperature and humidity, and the user's past behaviors can all be used to determine whether the user is thirsty. In addition, other context information can also be employed to determine whether the advertisement is appropriate for presentation (e.g., an indicated or learned preference that the user does not want to receive advertisements while they are exercising). The various relevant context information is passed to the characterization module 3 10, which then applies one or more filters suitable for controlling whether a cooling drink advertisement should be presented to the user at this current time.

As another example, the filtering system 124 may delay presentation of an acceptable message that matches the filter criteria until a filter 124 or the characterization module 310 determines that the user context matches the presentation requirements of the message. Suppose the user's current context suggests that the user is not able to give attention to incoming messages. For instance, the user is driving a car and is not able to view the message at this particular time. Now, suppose that the user receives an incoming message that is of interest to the user (e.g., a one-time sale on travel tickets to a desired destination). The filters and characterization module allow the message to successfully be received, but the user's context determines that the message cannot be displayed yet. Accordingly, the filtering system 124 accepts the message, but delays presentation until the user's context has changed (e.g., stopped driving) and the user is in a better condition to receive the advertisement. When the context finally changes or when the user specifically notifies the characterization module to present the message, the user can experience the message without interruption or distraction.

As another example, the filtering system 124 may employ a multi-tier filtering process using a hierarchy of multiple filters. The filters may be directed to different sets or categories of messages, with the collection of filters effectively finding a subset of messages acceptable to each of the filters. The characterization module can construct a filter composite as conditions warrant to effectively and dynamically produce unique filters as the user's context dictates.

Such construction of multi-tier filters could be performed in a variety of ways. For example, in addition to specifying information (e.g., context attributes) that indicates whether a filter matches the current context, in some embodiments filters could additionally specify inter-filter information that assists in determinations of whether two or filters are compatible. Such inter-filter information could indicate a directional relationship, such as one filter providing an output indication that is used as input as another filter, or merely that two filters are not inconsistent (e.g., a first filter that prohibits advertisements about specified products would be inconsistent with a second filter that indicates a desire to receive advertisements about those same specified products).

In addition, information about categories or groups of filters, and/or of hierarchical relationships between filters, could also be used when dynamically generating multi-tier filters. For example, if a first filter selects a group of information as appropriate that is a proper subset of the group of information selected by a second filter (e.g., a second filter that selects any drink advertisement as appropriate and a first filter that selects only diet soda drink advertisements as appropriate), use of the second filter in conjunction with the first filter would be redundant—this type of inter-filter relationship may be ascertainable based on a hierarchical relationship between the filters. Similarly, in order to determine filters that are compatible, it may be appropriate in some embodiments to select only filters that are members of a common group or category, or to instead select only filters that are each from a distinct group of category. Examples and uses of hierarchies, groups and categories are discussed in greater detail in U.S. patent application Ser. No. 09/825,159, filed Apr. 2, 2001 and entitled "Thematic Response To A Computer User's Context, Such As By A Wearable Personal Computer" (now U.S. Pat. No. 7,076,737), and such information can similarly be applied to filters.

Figure 4:
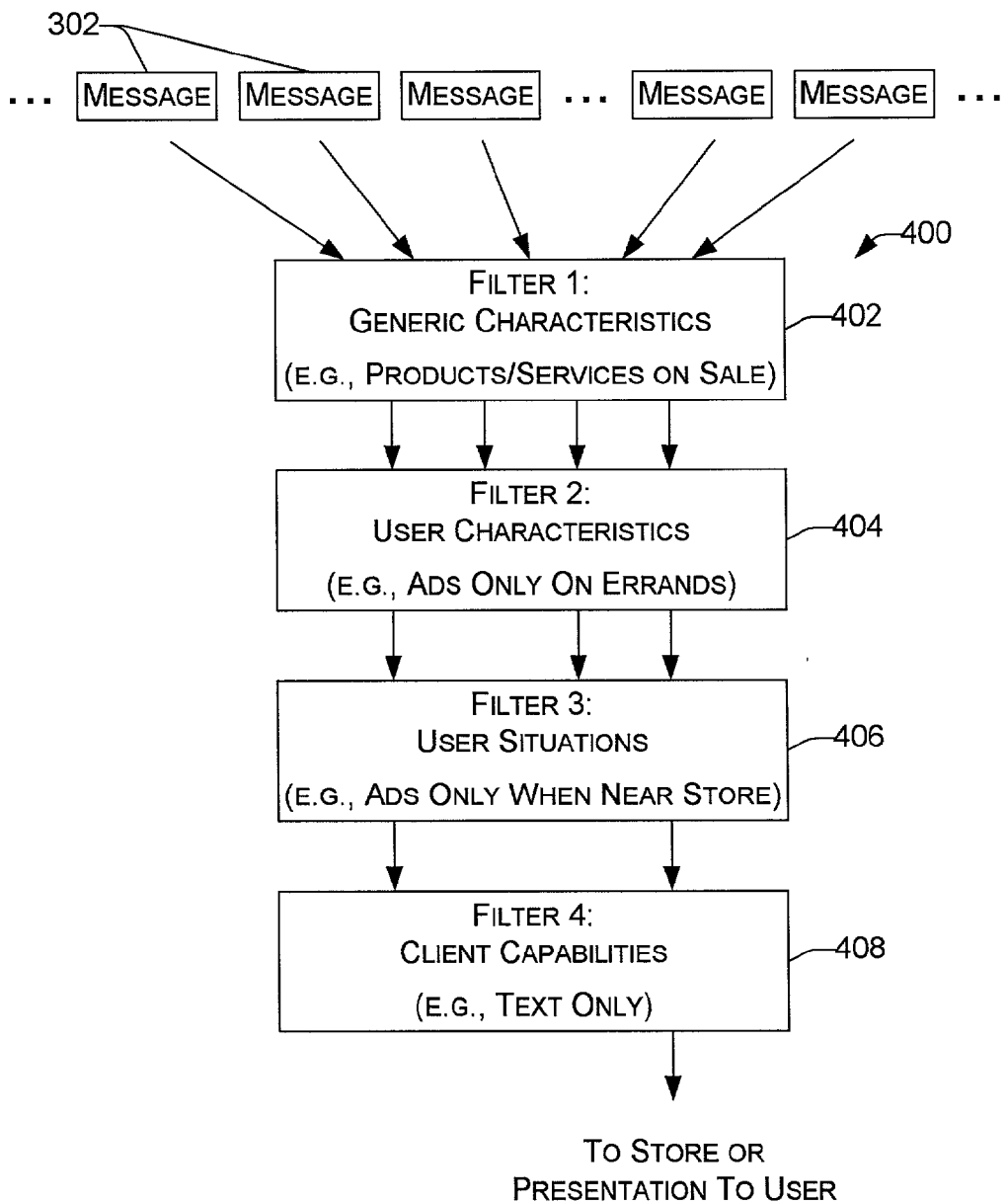
FIG. 4 illustrates a composite filter consisting of a hierarchy of filters for filtering incoming messages.

FIG. 4 illustrates a filter composite 400 that is made up of four filters 402, 404, 406, and 408. As an example, the first filter 402 might specify generic characteristics of suitable messages, such as the product/service characteristics for advertisements. The second filter 404 might specify user characteristics and preferences. For instance, the user might only want to receive advertisements while running errands. The third filter 406 might describe certain user situations in which messages are appropriate. In this example, the user might only want to see or hear advertisements for products when proximally near a store. The fourth filter 408 might pertain to the client computer capabilities. For instance, the client may be a communication device that can only receive text messages, as opposed to graphical or video messages. A message satisfying all the filter criteria of the filter composite 400 is then stored and/or presented to the user.

Message Filtering Process

Figure 5:
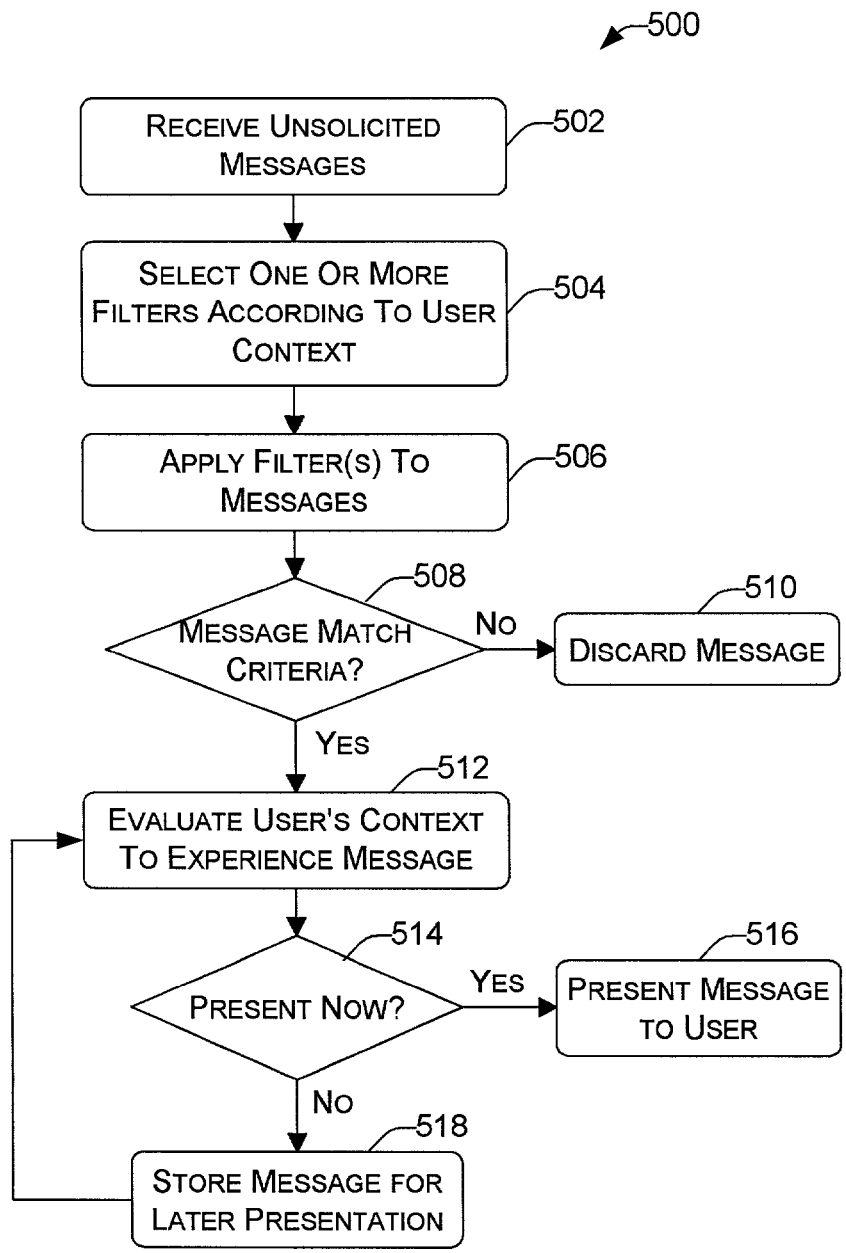
FIG. 5 is a flow diagram of a process for filtering incoming messages and deciding when to present the messages based on the user's context.

FIG. 5 shows an example process 500 for filtering messages according to a user's context. The process 500 may be implemented in software, or in a combination of hardware and software. As such, the operations illustrated as blocks in FIG. 5 may represent computer-executable instructions that, when executed, direct the system to display virtual information and the real world in a certain manner.

At block 502, messages (e.g., unsolicited messages) 302 are received at the client 106 from the information sources 102. At block 504, the context-based information filtering system 124 selects one or more filters 126 to apply to the incoming messages. The characterization module 310 of the filtering system 124 is frequently updating the set of filter(s) 126 to use for incoming messages according to the environment conditions of the user. As the messages are received, the current set of filter(s) 126 is applied to the messages (block 506).

At block 508, the characterization module 310 determines whether the messages match the filter criteria. If the messages fail to match the criteria (i.e., the "No" branch from block 508), the messages are discarded (block 510), or could instead be stored for later consideration (e.g., explicit user review or more detailed automated processing). Alternatively, if the messages match the criteria (i.e., the "Yes" branch from block 508), the characterization module 310 evaluates the user's current context to decide whether the user should currently experience the acceptable messages (block 512).

At block 514, the characterization module 310 determines, based on this evaluation of the user's context, whether to currently present the message. If the user context indicates that it is appropriate to present the message to the user (e.g., the user an agreeable state to review the messages), the characterization module 3 10 forwards the message(s) for immediate presentation (block 516). Presentation may be in the form of displaying a text message, rendering a graphical or video message, playing an audio message, releasing an aroma of a olfactory-enabled message, and the like.

If the user context indicates that it is not appropriate to currently present the message (i.e., the "No" branch from block 514), the characterization module 310 stores the message(s) for later presentation (block 518). When messages are stored, the characterization module 310 can continue to monitor the user context for any changes that might allow presentation of the stored messages. The characterization module can also in some embodiments provide notification to the user to inform them that one or more messages are available for presentation (e.g., an indicator shown on the display or a subtle background sound that is played), thus allowing the user to explicitly select the messages for presentation when the user desires.

There are a number of ways that the content may be presented to the user. Content may be displayed, audibly played, released as an odor, output as a tactile feedback, and the like. Additionally, the choice of a suitable presentation mechanism may be determined based on the user's context. That is, after the content passes the filters and is determined to be presentable at this moment to the user, the characterization module 310 might still further decide how best to present the information. For example, a user who is preoccupied watching objects or their surroundings may not wish to see any messages, but might be inclined to listen to them. Thus, the characterization module might determine to play any audio messages that might be ready for presentation. In other situations, the user might be more inclined to see the information on a display or watch a monochrome.

Message Distribution System with Intermediary

Figure 6:
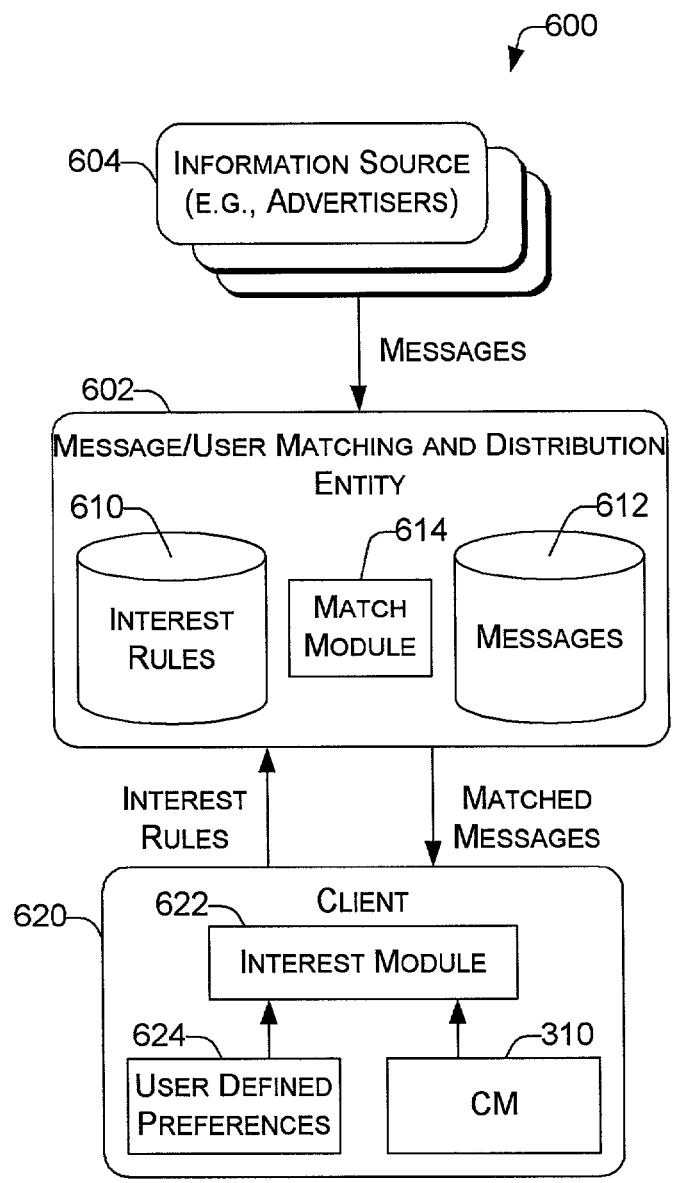
FIG. 6 illustrates a message distribution system in which an intermediary entity matches messages to intended users and distributes the messages on behalf of information sources.

FIG. 6 illustrates an exemplary message distribution system 600 in which an intermediary entity 602 acts as a distributor of messages on behalf of an information source. This system 600 is particularly suited for the commercial advertising market in which the information sources consist of advertisers 604 that are attempting to locate users who might be interested in their products and services. The system 600 supports a revenue model for deriving revenue based on the service provided by the entity 602. The revenue model includes a variety of possible fees for different levels of service.

The entity 602 performs services related to matching messages from information sources with suitable users who might be interested in the messages. The entity 602 maintains a registry 610 of interest-rules that are collected and maintained on behalf of individual users. The rules are correlated with the users to represent, for a given user, a composite of the user's desires, preferences, past behaviors, presentation surfaces capabilities, user demographics, and so forth. The entity 602 also maintains a message store 612 to store messages (e.g., advertisements) received from the advertisers. A match module 614 compares the messages in the message store 612 to the interest rules in registry 610 to identify users who might be interested in selected messages.

Each client 620 is equipped with an interest module 622 that generates rules indicating which items may be of interest. The interest module 622 creates these rules based on specific user-defined preferences 624 and traits/characteristics gathered by the characterization module 310. The client 620 occasionally submits the rules for that user to the entity 602 for storage in the registry 610.

When advertisers look for interested consumers, they can send their advertisement (optionally with metadata) to the entity 602. The advertiser may be asked to pay a subscription or handling fee to the entity for access to likely consumers, and in some embodiments the intermediary entity provides a payment module to facilitate the exchange of payment between the intermediary, the clients, and the information sources. The entity 602 stores the received advertisement in the message store 612, and then invokes the match module 614 to compare the advertisement with the rules in the interest-rule registry 610. If there is a match, this indicates that a particular user might be interested in the advertisement. There may be a fee associated with matching the message to various users based on their interest rules.

When a message is determined to be potentially of interest to the user, the entity 602 delivers the message to the user's client 620. The client-side characterization module (not shown in FIG. 6) then determines, based on the user context, whether to present the message or store it for later presentation. In some embodiments, the filter mechanism could rely on the intermediary to provide information that is appropriate to the current context, while in other embodiments the filter mechanism could perform additional processing using current filters to determine whether to accept delivered messages. If the message is presented to the user, the advertiser may be asked to compensate the user and/or the entity 602. If the advertiser sells something to the user, the advertiser may be asked to provide an additional fee to the entity 602 for locating a buyer.

The entity 602 may be configured to perform other services that are beneficial to the users. The entity 602 may act, for example, as a trusted agent that examines messages submitted from the information sources to determine whether the messages adhere to acceptable standards of message characterization. The entity could be responsible for evaluating message format, structure, content, metadata, and the like to determine conformance with desired standards. As a trusted agent, the entity 602 can certify messages as being in compliance with these standards for the benefit of the user filters. Additionally, the entity could certify and verify information sources, to facilitate swift examination of messages from certified sources. Certified messages or messages from certified sources may be issued a secure certificate to indicate to the user filters that the message metadata can be trusted to accurately characterize the message, and to ensure that the filter will recognize the certificate's meaning. The message filter can respond to the secure certificate by automatically assigning a higher confidence rating to the message.

The interest rules for the user can be generated in a variety of ways. One example technique for generating such interest rules is described in greater detail in U.S. patent application Ser. No. 09/824,900, filed Apr. 2, 2001 and entitled "Soliciting Information Based On A Computer User's Context" (now U.S. Pat. No. 6,968,333). In addition, other techniques for generating themes and theme-related information are described in greater detail in U.S. patent application Ser. No. 09/825,159, filed Apr. 2, 2001 and entitled "Thematic Response To A Computer User's Context, Such As By A Wearable Personal Computer" (now U.S. Pat. No. 7,076,737). Similar techniques to those disclosed for generating user interest rules and theme-related information, either in combination or separately, can also be used to allow users to create and modify filters for use in analyzing received information.

In addition, in the same manner that advertisers or other information sources can provide messages or other information that may be of interest to users, such sources could also supply filters to be distributed to users via the intermediary entity or instead directly to users. In some situations such filters could be distributed as part of a business model, such as by selling the filters to users. In other situations the filters could be distributed for the convenience or benefit of the information sources (e.g., a product/service provider or related advertiser providing a filter that selects as appropriate only those advertisements that are for those products or services), and in some embodiments the information sources could compensate the users for accepting and/or using the provided filters. Such filters could also be provided to users based on a group to which the user belongs (e.g., filters distributed by an employer to all employees or to employees meeting specified criteria) and/or based on a geographic location of the user. In some embodiments, filters are associated with themes (and are thus one type of theme-related information for those themes), and can be distributed in conjunction with the distribution of those themes.

In addition to (or instead of) automated selection of filters, in some embodiments users can explicitly indicate appropriate filters. For example, in response to receiving information that was determined by automatically selected filters to be appropriate, the user could indicate that the information was instead inappropriate (or was presented in an inappropriate manner). The user could also indicate that one or more of the automatically selected filters should not have been selected and/or that another filter that was not selected should have been selected. In this way the user can explicitly adjust the information that is determined to be appropriate.

Moreover, in embodiments in which the user provides explicit indications of appropriateness (whether by selecting filters or by indicating that filters and/or presented information is appropriate or inappropriate), the system can use automated learning techniques to enhance future selections and use of filters. In this manner, a filtering system can be continually customized to a particular user, thus enhancing the usefulness of the filtering. Additional details about the use of such automated learning techniques are provided in U.S. patent application Ser. No. 09/825,152, filed Apr. 2, 2001 and entitled "Contextual Responses Based On Automated Learning Techniques" (now U.S. Pat. No. 6,842,877), which is a continuation-in-part of U.S. patent application Ser. No. 09/216,193 (now U.S. Pat. No. 6,466,232), of U.S.

patent application Ser. No. 09/464,659 (now U.S. Pat. No. 6,513,046), and of U.S. patent application Ser. No. 09/724,902 (now U.S. Pat. No. 7,231,439), and which claims the benefit of provisional U.S. Patent Application No. 60/193,999 and of provisional U.S. Patent Application No. 60/194,123. Each of these applications is hereby incorporated by reference in their entirety.

In addition to using modeled context information to select filters or dynamically generate filtering capabilities, such context information can more generally be used in some embodiments to control the sharing of a user's context or other computer-controlled information with other users and/or computing devices. Such sharing of information can be conceptualized as the filtering of outgoing information (rather than incoming information), and arbitrary groups of context attributes can be specified as constraints on the sharing. For example, based on the user's modeled location, physical activity, presence of particular other people or objects nearby, and emotional state, it may be determined that certain groups of user context information will be made available to people in the user's family, that other groups of user context information and other stored information will be made available to co-workers, and that no one other than the user may have access to yet other groups of information. In particular, in some embodiments information sharing filters will be defined and used in a similar manner to that described above for received information filters. Alternately, existing mechanisms for grouping or using groups of context attributes can be extended to include information sharing filter information, such as defined themes or received information filters.

There can be multiple tiers of information sharing (or "permission") characterization, and such tiers can be selected in various ways. One example of tiers of information include information that is available to the user themselves, to other users in one or more groups or categories to which the user belongs, to users in other groups or categories to which the user does not belong but has a defined relationship, and to everyone. Those skilled in the art will appreciate that these tiers can be expanded or contracted in various situations—for example, as noted above, a user may belong to many groups (e.g., family, club, work, etc.) that each have different permission schemes. Similarly, in a specific group of applications such as multi-player games, the other groups can include competitors, whether individuals or teams, and additional tiers could be added, such as for non-player spectators or for game creators/administrators. In a business setting, other groups may include partners, suppliers, customers, etc. Such permission tiers can also be used when receiving information from others that are employing such information sharing filters, such as to receive team information from other members of your team in a multi-player game setting, whether the information is aggregated (e.g., by a third party, such as a team leader) or specific to each of the other members.

Permission information can also be specified in various ways. Since a context attribute can be shared as a data item, permission information related to that context attribute can be specified with an explicit characterization of permission and/or an associated permission algorithm (e.g., as an extended property of that context attribute), or the value of the context attribute can instead be treated as any other information that potentially may be distributed. In particular, any such information can be characterized with one or more properties (e.g., based on the information content or other related information) as to who/what/when/where/how/why that information can be shared. For example, it may be desirable to have all context information and other information that is related to my current and historic physical health be characterized as being available to medical professionals providing assistance during a medical emergency. In addition, in some embodiments a user may not have authority to examine and/or modify the permission scheme or information associated with their context attributes or other information. An example of this may be in an institutional setting where the system is provided for a purpose that is controlled by the institution.

In addition to the general applicability of the disclosed techniques for selecting appropriate information, various specific uses of the previously disclosed techniques and other related techniques follows. For example, computer gaming environments provide situations where modeled user context information can be used to significantly enhance the gaming experience, such as by selecting appropriate game-related information or functionality based on the user's context and presenting it in an appropriate manner. When some or all of the game participants use wearable computers, even greater enhancements are available, as discussed in greater detail below.

Thus, in some embodiments techniques for determining various details of the user's current context (e.g., the physical location of the user in the real world and the user's current mood) and interacting with the user in various ways based on that context information. In some embodiments, such techniques could be provided directly by gaming applications designed to implement the techniques, while in other embodiments the techniques could be added to existing games by an external component (e.g., provided by a third-party).

One way that gaming applications can be enhanced is by augmenting the user's reality (i.e., integrating computer-provided information into a user's perception of their physical reality) via the 110 devices of the user's computer. The enhanced 110 device functionality that is typically available on wearable computing devices is one reason that such wearable devices can in some situations provide enhanced functionality not available to standard computing devices that lack the 1/0 device functionality.

The ability to augment reality in this manner provides various benefits in both gaming and non-gaming applications. For example, in gaming applications the game-related information (and thus the corresponding gameplay) can be layered on top of real life, and the game player's perceptions can be enhanced by the wearable computer. In a similar manner, the real world can be brought into the game in various ways. For example, virtual objects can be made visible to the player (objects, scenes, matte painting, etc.) but not to other nearby non-players. In addition, avatars (whether real, computer-generated players, or opponents) can similarly be presented, and such avatars can additionally react to the user's context (e.g., presentation of an avatar can be based on the player's physiological state, such as displaying an avatar in a different manner if the user is startled or afraid). An avatar representing a player can also be modified based on the context of the player, such as making the avatar more visible if the person is scared or if the person or avatar is moving too fast.

Other examples of enhanced gaming (or non-gaming) functionality using augmented reality include displaying virtual information, such as virtual footprints that reveal the passage of a person through an area so as to allow tracking/trailing someone in the game or in real life or to allow the user to retrace their own path. In a similar manner, virtual graffiti tags (i.e., computer-generated markings visible only to participants in the gaming system) can be displayed, providing a variety of possible games and uses (e.g., playing 'Tag', or playing a virtual 'Go' game played in any agreed boundary, such as by using city blocks as a playing game and seeing the Go pieces from an above-city view, etc.)

While there are existing examples of presenting a visible logging of where someone or thing has been on a representation of terrain, only very limited information is typically conveyed. By providing a system where arbitrary information can be associated with the logging, the user can enjoy the benefit of richer and more appropriate information that is presented in an optimal manner. For example, the display of the virtual footprints can be overlaid on the user's vision of the real world in the same location as the actual steps were taken. Other functionality can also be provided, such as varying footprint visibility based on the user's context (e.g., the skill of the prey and/or tracker, or having footprints that fade over time). Alternately, an entertainment or training application can use a log of a route of a well-informed person as a guide to others, and information such as the guide's comments or recommendations to supplemental information can also be presented (e.g., as iconographic controls within the route, or as audio information when the location is achieved). Individuals and institutions can use individual or aggregates of individual paths to determine used routes, which can assist in identifying areas of interest and congestion. By allowing such a log of locations and routes to be public, a "Public Scrapbook" can be created over time. In addition, by being able to see a route overlaid on the view of the physical world, a user can easily determine if they have been somewhere before (e.g., to avoid being lost or to find a way through complex terrain).

The ability of the computing devices of the various players to communicate also provides enhanced functionality. For example, distributed observations can be provided by a system of connected players, such as by augmenting a player's senses with information from teammates or allowing a player to hack into other team's members and experience their environments. Remote tele-presence sensing can also be provided, such as providing a view to a user of a lookout in a tower. In addition, dynamic aggregation of players can be used to determine if there are enough people available to play a game at a given moment, either locally or worldwide depending on the nature of the game. The use of context information about such other players allows for the choosing of opponents and team members based on the capabilities, interests, or other arbitrary characteristics of the players. In addition, games rules (e.g., defaults) can be modified based on communications between players (or by selecting a group of players with common interests).

Thus, as noted above, augmented reality allows games to react to real world events, such as by determining player positions in the game via the physical location of the user (e.g., via available locating devices such as GPS, EGPS, etc.). More generally, the context attributes that are used to characterize a user's virtual world could be based on the context attributes from the physical world—thus, a computer-generated person or object shown in an augmented reality context could have the same characteristics as a real person. One application of such attribute mapping would be the control of a digital representation of a user by basing its appearance in part on the user's context model, thus allowing the digital representation to respond to changes in the user's physical world. For example, in response to a user becoming fatigued in the real world, the corresponding avatar's strength or speed could similarly be reduced, or an avatar's posture could change along with that of the user. A context attribute such as user fatigue can be measured in various ways (e.g., the speed of user movement, stooping, speech slurring, etc.) In addition to basing an avatar's appearance and capabilities on those of its corresponding user, other game-provided functionality can also be altered in response to changes in a user's context. For example, the capabilities provided to a user could be varied based on the skill level of the user. In addition, games can be dynamically optimized during play based on the changing user context (e.g., changing skill level or tendencies of the player that are learned by the game), whether automatically by the game or by a game organizer.

Games can also react to or incorporate the real word in other ways. For example, users' movements can be incorporated fully into the game, and are not limited to the constraints of a specialized input device such as a Dataglove or a device that senses hand movements immediately proximate to the device (e.g., via analysis of video image from a camera that can see a user's arm movements, or via motion sensing devices on various limbs of the user). Tracking and using such movements allows fighting games to include more than just hand-eye coordination, and can allow simulated use and movement of virtual weapons (e.g., guns and sabers) or virtual body parts (e.g., playing karate against the computer).

In a similar manner, augmented reality allows the gaming experience to impact the real world in various ways. For example, if a user is wearing a goggle display device or a computer-controlled brace on a limb, the player's vision could be occluded or the use of the limb restricted based on events that occur in the game. In addition, using output devices such as goggle display devices and earpiece speakers/noise-canceling devices, the presence or appearance of a player can be altered for other players. Moreover, new senses can be generated and supplied to the player, and existing senses can be enhanced or remapped. For example, a "Hide & Seek" game is more challenging if the players have infrared or night-vision capabilities, and sonar allows a user to see behind themselves. Similarly, augmented hearing or sight can provide new abilities to a user, or information (e.g., a ringing sound) could be generated to represent an entirely new sense (e.g., the ability to sense the nearby presence of Evil).

Such enhancement capabilities can benefit a wide variety of currently available games, and can additionally make possible new games. For example, an "Assassin" game could be played by any group of people with wearable computing devices at any time (e.g., strangers at an airport dynamically identify each other as interested in playing and then begin playing using virtual weapons). As noted above, player appearance can be altered with appropriate output devices, and additional information can be provided via linked gaming computing devices (e.g., an Assassin is within 100 yards). "Team Fortress" could similarly be played in the real world, allowing real-time collaboration between players, as could "Virtual Tennis" between two players anywhere in the world. Similarly, "Rally", a scavenger hunt using player context (e.g., current location) to generate clues, and virtual gambling that is constantly available (whether individual or group games) are other examples.

In addition, new capabilities could be provided, such as an ability to plant virtual sensors that detect other game players or to plant virtual landmines that reveal players when triggered (e.g., visually augmenting the revealed player's presentation and/or providing location and other context information about the player to other players). In addition, sensors could be provided in physical devices, such as a Bluetooth-enabled golf ball that assists users in recovering lost balls. Moreover, if various mental user context information can be detected (e.g., via choices signaled by Hz on-screen-frequency-selection and/or via biofeedback), games could react to such information. In addition, a variety of types of interesting information (both context attribute information and other information) could be provided to external audiences (or to team members or competitors) in a similar manner to cameras in NASCAR autos. This allows observation of games that are currently unobservable, such as "Half-Life" or various other games viewed with a wearable computing device. By providing relevant information to a game organized/manager, that person can opportunistically manage on-going games.

Figure 9:
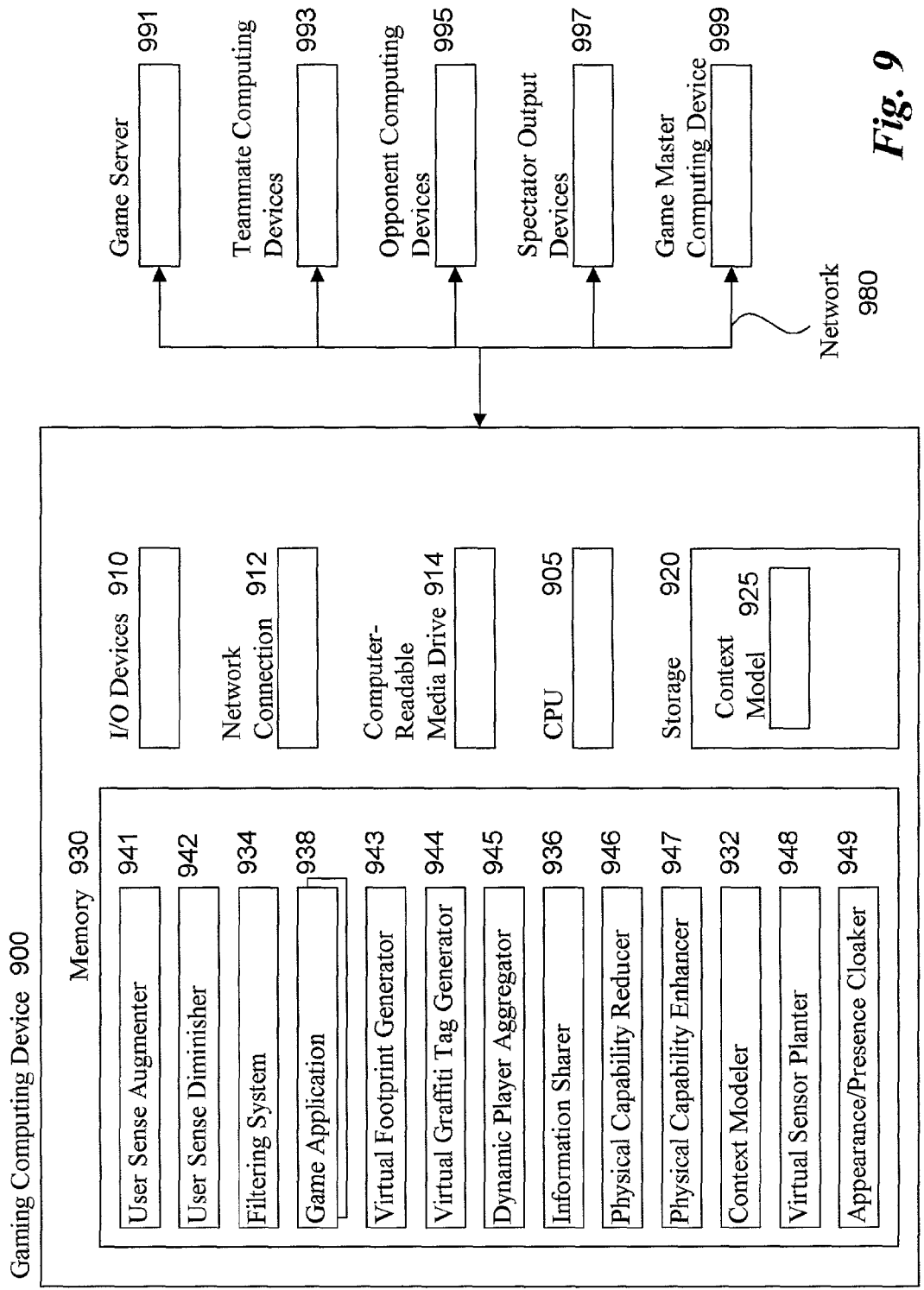
FIG. 9 is a block diagram illustrating an architecture for enhancing gaming environments by providing appropriate information and functionality based on a user's context.

FIG. 9 is a block diagram illustrating an architecture for enhancing gaming environments by providing appropriate information and functionality based on a user's context. As is shown, various components execute in memory of a user's gaming computing device, including one or more game applications 938. Various optional game enhancement components 941-949 are also illustrated, although those skilled in the art will appreciate that in alternate embodiments only some of the components may be present. In addition, in other embodiments the game applications themselves will incorporate the desired enhancement functionalities. While the illustrated embodiment also shows a received information filtering component 934, information sharing component 936, and context modeler component 932 executing in memory, in other embodiments some or all of these components may not be present. The information filtering and sharing components, as well as various of the game enhancement components, can communicate with various other computing devices as illustrated.

Figure 10:
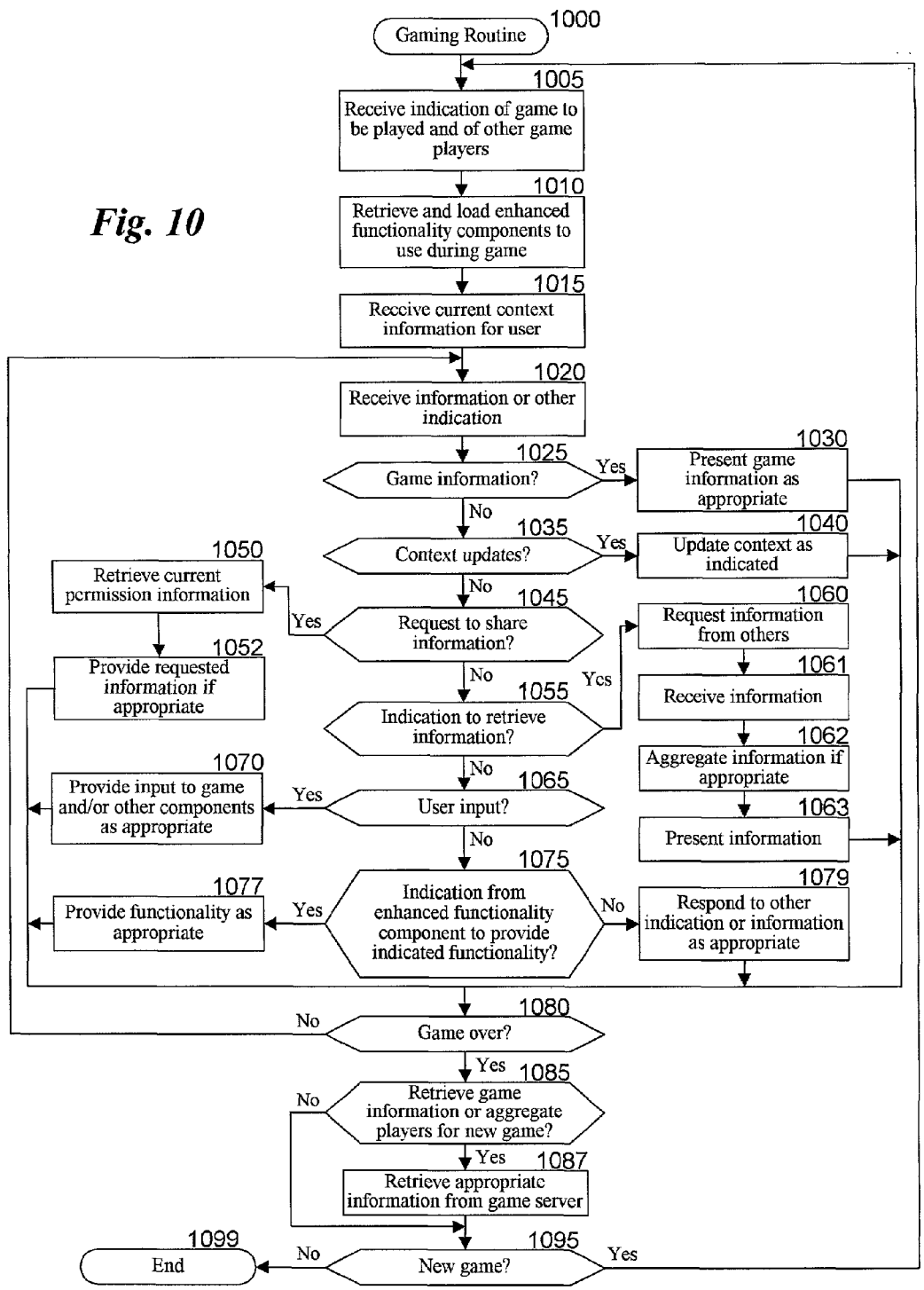
FIG. 10 is a flow diagram of an embodiment of a Gaming routine.

FIG. 10 is a flow diagram of an embodiment of a Gaming routine. The routine provides various enhanced gaming functionality by using context information of the user, as is illustrated and is described elsewhere.

As noted above, the use of various context information can provide a variety of types of game enhancements. Examples of relevant types of context information include the following:

Physical Characteristics

Fatigue—if the player is tired, this can be used to change the capabilities of their game character by making it slower.

Dexterity someone with limited physical skills may be programmatically associated with characters of reduced skill, thereby giving a realistic expression to their capability. Conversely, their input device responses may instead be enhanced, thus giving them opportunities to compete on a more equal and satisfying basis.

Location—where a player currently is, or will be. This can be used for games that involve the real world, such as geo-caching, or games that require access to physical facilities. This is also useful for games and competitions that are races through physical locations.

Availability—when a player can play, for how long. Also, how much they are willing to pay or risk.

Payment—indication that player or group has paid entrance fee or dues.

Insurance—indication that player or group has necessary insurance.

Mental Characteristics

Skill—a player's or teams' skill (e.g., based on self-characterization, automated handicapping system, 3rd party rating, etc.) can be used to match them with appropriate adversaries. This can also be used by a spectator to choose what matches to watch.

Memberships—enumeration of which organizations or groups a player belongs to. This can include certifications by gaming, safety or other organizations.

Familiarity—in contrast to Skill, which relates to proficiency, Familiarity provides an indication of a potential player's ability to play the game. For example, are they familiar with the rules of the game?

Interest—a player can indicate, or have stored an indication of, the characteristics of games that they are interested in joining, observing, officiating, reviewing, buying, or selling.

Current & Past Scores—a log of an individual's or teams' performance can be maintained and shared.

Age—useful in determining appropriateness of game content. Since game environments can dynamically respond to changes in aggregate player characteristics, this attribute can be used to determine when it is appropriate to change the content from child to adult. For example, later in the evenings, after children stop playing, more adult language and themes can be employed. Alternately, when a family is simultaneously playing the same game, provide a more limited or different set of content to the children than is provided to the parents.

Roles—Role playing games often have game characters that have persistence over multiple game sessions. Attributes characterizing the game roles, including character names, experience, and skills, can be shared.

Language—which language(s) the player speaks

Risk—indication of how much risk, physical or monetary, the player is willing to experience.

Platform Capability

I/O Devices—to what devices does the player have access, and what are their capabilities? For example, can the player use a head-mounted display that supports the superimposition of color computer-generated images over their view of the real world?

Processing—how fast is the player's computer (CPU, RAM, video cache, etc.)

Game Capability—an enumeration of games, or levels of games, can be explicitly enumerated Storage—how much mass storage is available for games Software—what software is available Data Capability Connectivity—what is the bandwidth and speed (sometimes called "ping time") of the computer platform's network connections Security—what protocols are supported Various group characteristic information can also be provided and used, such as attribute permission schemes that indicate the scope of information to be shared. Attributes can also characterize or identify the different groups of users to which the permission scopes will apply. For instances, different group scopes can include the following: the player (they might be able to see all of their attributes, or instead some may be hidden or provide false information during some games), the player's team (they made be able to see some/all of their teammates, and aggregate team attributes), the game's organizers and officials (they could see all players attributes, for example), the game's commentators (they could see some/all team and player attributes), and the game's audience (they could see some/all team and player attributes).

The disclosed techniques for selecting and presenting appropriate information can be used in some embodiments to modify the normal operation of the user's senses in various ways. Moreover, there are many examples of sensory enhancements that can benefit from a general model of user context. For example, context information can indicate when and how to map electromagnetic spectrum frequencies to human perceivable frequencies (UV, IR), sound, pressure, etc. Each spectrum frequency could additionally be mapped in a variety of ways. For example, with respect to sound, the mapping could provide example functionalities as indicated in the following list:

greater frequency sensitivity greater volume sensitivity and/or volume normalization (e.g., increase low and suppress high frequencies, or increase the compressed dynamic range such that the average sound is greater even though the peak volumes do not change)

selective frequency suppression (e.g., low rumbles while in engine room)

noise cancellation (not just fixed, but user-selective in type and degree)

mapping of senses (e.g., proximity to objects is translated into sounds, a VU meter, determining the tempo of the music, etc.)

Moreover, a computing device could provide additional sound-related functionalities, such as triggering notifications or functionality when certain conditions are met (e.g., when siren occurs the audio is lowered, a SID monitor, detect when engine sound deviates from normal, a dangerous volume monitor, etc.). Sounds could also be automatically identified, such as by identifying a human speaker based on voice, a fire truck or police car, friendly versus enemy fire, etc. Sounds can additionally be characterized in various ways, such as to determine whether the gun fire is aimed in my direction, whether the fire truck is coming toward me, whether that bird call was from a real bird, how far away was that twig snap, etc.

Augmenting reality (e.g., with computer-generated images, sounds, smells, sensations, etc.) is not limited to adding or transforming indicated, measured or inferred data—instead, it can also include the blocking of real-world stimuli. For example, when light of a potentially hazardous amplitude or frequency is detected, the portion of a transparent display through which the radiation is passing can be made opaque, thereby protecting the user's eyes. Similarly, audio noise canceling algorithms can be used to protect hearing. The system can also obscure undesirable options, such as sub-optimal routes when driving at high speed in an unconstrained terrain (like desert). For workers who are be visually distracted by their environment (e.g., by people in adjoining cubicles), non-work related stimuli could be obscured. In addition, computer controls can be hidden based on the context as an alternate way to give prominence to something in the real world (i.e., by obscuring less relevant information). For training purposes, the system could eliminate incorrect choices over time to assist a user in identifying the correct choices and judging their mastery of the task. For entertainment purposes, a temporary or permanent loss of perception can be provided during a game (e.g., when a player has been successfully attacked). Moreover, it is not just senses that can be modified, but also physical capabilities or cognitive ability (e.g., there can be less game or context information or computing capabilities made available in order to simulate the loss of personal or equipment function).

Figure 11:
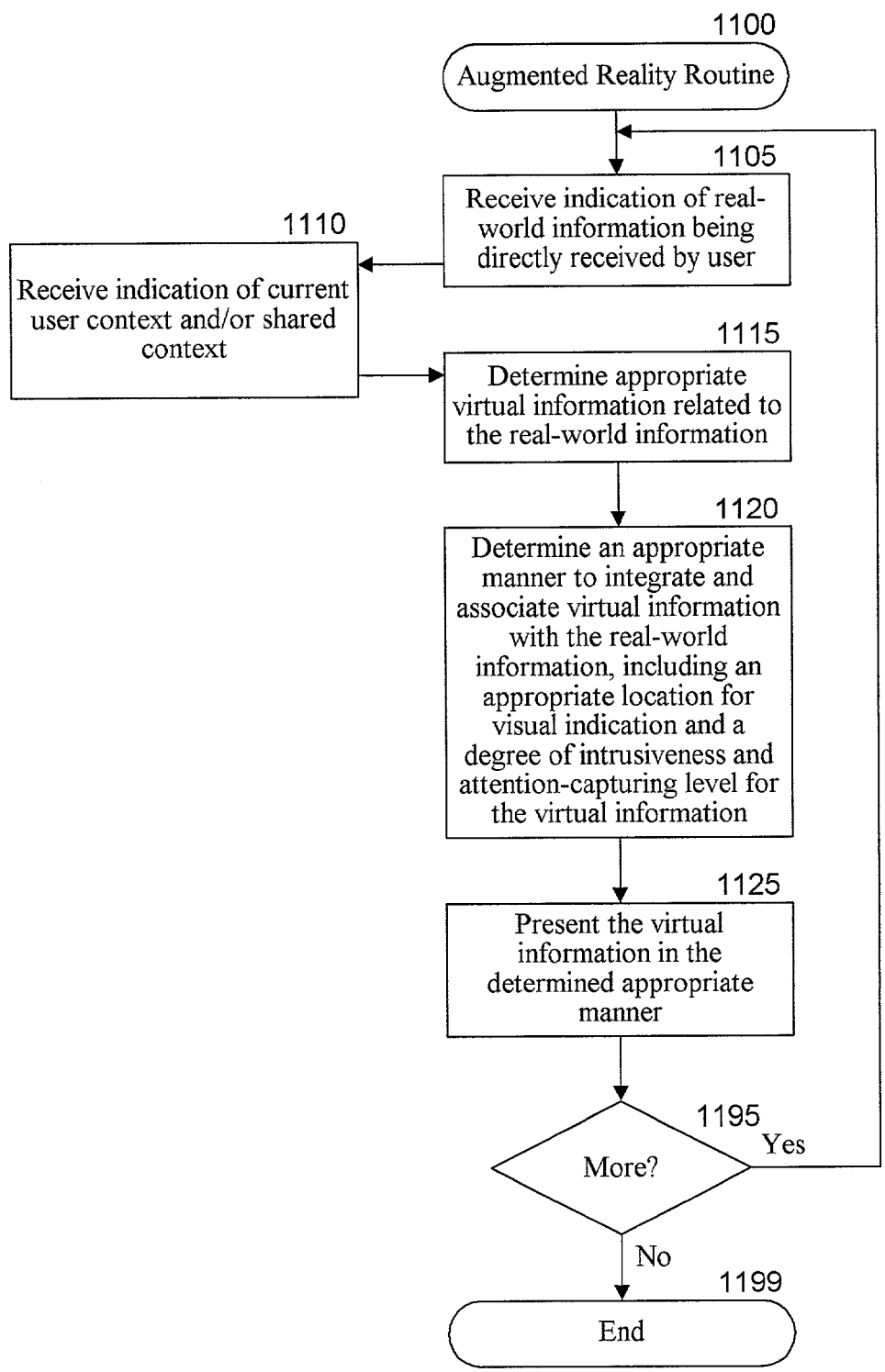
FIG. 11 is a flow diagram of an embodiment of an Augmented Reality routine.

FIG. 11 is a flow diagram of an embodiment of an Augmented Reality routine. The routine augments real world information available to a user with virtual information based on the user's context, as is illustrated and is described elsewhere.

As described above, augmented reality involves presenting virtual information in conjunction with real world information that is available to the user. However, existing technology is often unable to dynamically integrate virtual images with the real world without hardware clues. Maintaining the overlaying, or visual mapping, of virtual objects on top of real-world objects is known as registration. One example of registration is superimposing a virtual image of a wire over the real-world view of the wire, and having that virtual wire remain properly associated with the real wire while the user's head may be moving. Technology can perform this by adding visual clues to the hardware, such as dots on the circuit board containing the wire. Another example of the difficulty in managing the overlay of virtual info onto the real world is the difficulty formatting computer controls without conflict with viewing the real world.

While registration functionality is difficult to provide using existing technology, the use of current context information about the user can greatly facilitate the providing of registration without the use of hardware cues. Thus, some embodiments of the invention include a context-aware system that models the user, and uses this model to present virtual information on a display in a way that it corresponds to and enhances the user's view of the real world.

In one embodiment, the system displays information to the user in visual layers. One example of this is a constellation layer that displays constellations in the sky based on the portion of the real-world sky that the user is viewing. As the user's view of the night sky changes, the system shifts the displayed virtual constellation information with the visible stars. This embodiment is also able to calculate and display the constellation layer during the day based on the user's location and view of the sky. This constellation information can be organized in a virtual layer that provides the user ease-of-use controls, including the ability to activate or deactivate the display of constellation information as a layer of information.

In a further embodiment, the system groups various categories of computer-presented information related to the commonality of the information. In some embodiments, the user chooses the groups. These groups are presented to the user as visual layers, and these layers of grouped information can be visually controlled (e.g., turned off, or visually enhanced, reduced) by controlling the transparency of the layer.

Another embodiment presents information about nearby objects to the user in a manner that is synchronized with the real world surroundings. This information can be displayed in a variety of ways using this layering invention of mapping virtual information with the real-world view. One example involves enhancing the display of ATMs to a user, such as via a layer showing streets and ATM locations or a layer that displays ATMs near the user. Once the user has found an ATM, the system could turn off the layer automatically, or instead (e.g., based on the user's configuration of the behavior) could simply allow the user to turn off the layer.

Another embodiment displays a layer of information, on top of the real-world view, that shows information representing the path the user traveled between different points of interest. Possible visual clues (or "bread crumbs") could be any kind of visual image, like a dashed line, dots or footprints, to represent the route the user traveled. One example involves a user searching a parking garage for a lost car. If the user cannot remember where the car is parked and is searching the parking garage, the system can trace the search-route and help the user avoid searching the same locations by displaying that route. In a related situation, if the bread-crumb trail was activated when the user parked the car, the user could turn on that layer of information and follow the virtual trail as it displays the information to the user in real-time, thus leading the user directly back to the parked vehicle. This information could also be displayed as a bird's-eye view, such as by showing the path of the user relative to a map of the garage.

Another embodiment displays route information as a bird's-eye view by showing a path relative to a map. This information is presented in overlaid, transparent, layers of information, and can include streets, hotels and other similar information related to a trip.

The labeling and selection of a particular layer can be provided to the user in a variety of methods. One example provides labeled tabs, such as those on hanging folders, that can be selected by the user.

The system can accomplish the presenting of virtual information on top of real-world information by various means. Three main embodiments include tracking head positions, tracking eye positions, and real world pattern recognition. The system can also use a combination of these aspects to obtain sufficient information.

The head positions can be tracked by a variety of means. Three of these are inertial sensors mounted on the user's head, strain gauges, and environmental tracking of the person. Inertial sensors worn by the user can provide information to the system and help it determine the real-world view of the user. An example of inertial sensors include jewelry that detects the turns of a user's head. Strain gauges (e.g., embedded in a hat or the neck of clothing) measure two axes: left and right, and up and down. The environment can also provide information to the system regarding the user's head and focus, such as via pattern-matching information of the user's head. This can occur from a camera watching head movements, like in a kiosk or other such booth, or any camera that can provide information about the user. Environmental sensors can also perform triangulation based on one or more beacons transmitting information about the user's head and eyes. The sensors of a room or a car can similarly triangulate information about the user and present that information to the system for further use in determining the user's view of the real-world. In addition, the reverse mechanism also works in which the environment broadcasts information about location (or distance from one the sensors in the environment), such that the system in that embodiment of the invention can perform the calculations without needing to broadcast information about the user.

The user's system can also track the eye positions of the user for use in determining the user's view of the real world, which can be used by the system to integrate the presentation of virtual information with the user's view of the real world.

Another embodiment involves the system performing pattern recognition of the real world. In this embodiment, the system's software dynamically detects the user's view of the real world and incorporates that information when the system determines where to display the virtual objects such that they remain integrated while the user moves about the real world.

Existing augmented reality systems are typically designed as tools to show to the user, in an enhanced way, spatial relationships between the virtual computer-generated world and the real world. They are not designed as new means to experience the world where the computer is simultaneously experiencing the world with the user and supplementing the user's experience with information the computer holds or determines and manifesting behavior in a fashion that is integrated with the user's experience of reality. Thus, what is missing in such existing systems is that they do not incorporate an extensible context model of the user. Utilizing a context model allows more complete integration—basing augmented reality on context awareness allows the interaction to become more appropriate and the content dynamically adapts appropriately.

Thus, using context information as part of an augmented reality system allows the integration of virtual information with real world information in such a manner that the computer does not merely activate output devices that can be directly perceived by the user, but instead the computer-generated information is shown in meaningful relationship to the perception of real-world information. For example, for a computer-generated name tag to be augmented reality in the sense it is used in this disclosure, it would need to appear to the user to be shown associated with the appropriate person.

Therefore, some embodiments include some or all of the following components in order to provide augmented reality that is enhanced with context information.

An explicit, extensible, dynamic, scalable, efficient software model of the relationship between a user's body and an arbitrarily complex representation of the user's immediate vicinity.

Abstraction of the context model from sensors—thus, allowing an arbitrary and dynamic set of data to be used in the context model without destabilizing the system Determination of what content is appropriate given their real world circumstances and needs Logically integrating the virtual and real content from the user's point of view.

Determination of how to best present the virtual information

Several determinations are made as part of the disclosed augmented reality system. First, what computer generated information is appropriate given the user's current context? For example, showing an image of an arrow toward North, or showing directions to the Doctor's office. Second, what is the user's current context? For example, the user may be currently heading and looking South. Alternately, the user is in a car with another passenger and can take the carpool lane, the appointment is 2 miles away but isn't for 20 minutes; and there are errands at the drugstore that can be accomplished along the way. Third, how can the appropriate information be presented so that it is meaningfully integrated into the user's perception of their world? For example, a small arrow can be displayed at the bottom of the screen pointing down. Alternately, directions can be provided that include use of carpool lanes and times that are reflective of speedier passage, with the amended directions and route drawn onto the road and the drugstore indicated as an interim destination.

Figure 7:
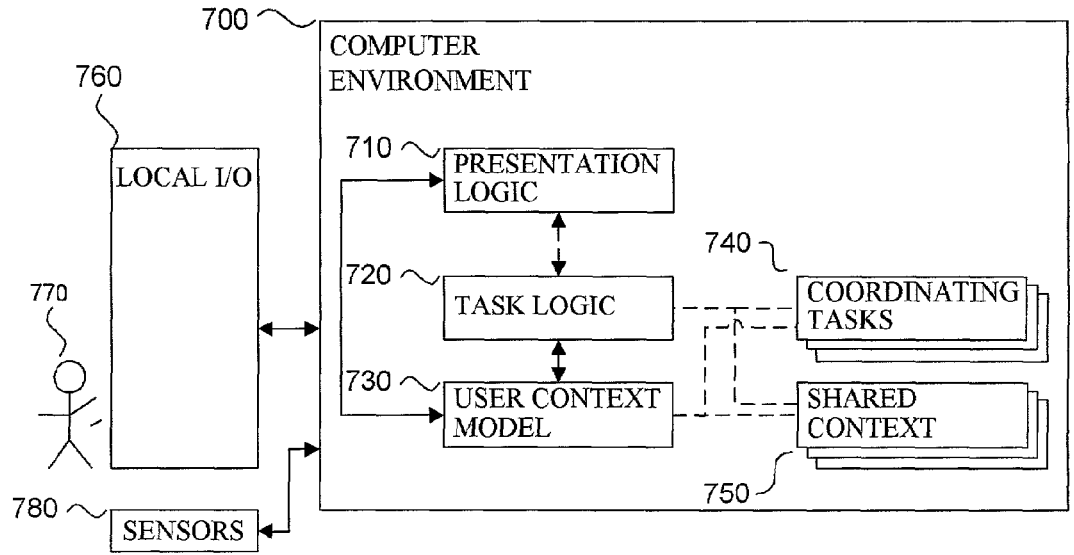
FIG. 7 is a block diagram illustrating an architecture for augmenting reality by presenting appropriate information based on a user's context.

FIG. 7 is a block diagram illustrating an architecture for augmenting reality by presenting appropriate information based on a user's context. Various information is illustrated, as is described in greater detail below.

User 770

Can include any person or animal that can perceive stimulus from both the real world and computer-generated.

The user maintains a bi-directional dialog with the computing environment via input and output devices, such as via gestures and utterances that are intended to convey intention to the computer, and generates context data that can include not only the gestures and utterances but also measurements, observations, narrations, third-party commentary, etc.

Local I/O Devices 760

Can include any directly perceived output devices—an example IS any video display that creates photons that are received by human eyes.

Can include any directly manipulated input devices—an example IS a keyboard or camera w/gesture recognition software.

Computing Environment 700

Can include any hardware platform or platforms, local or remote.

Provides general computer capabilities; data functions (generation, reception, processing, storage), communications, etc.

Presentation Logic 710

Determines what content is appropriate for the user's current and anticipated contexts based on current or anticipated physical relationship between the user's body and their environment.

Further can include logic that determines how to integrate from a user's first person point of view and how to communicate the integrated virtual information to the output devices for presentation.

Figure 8:
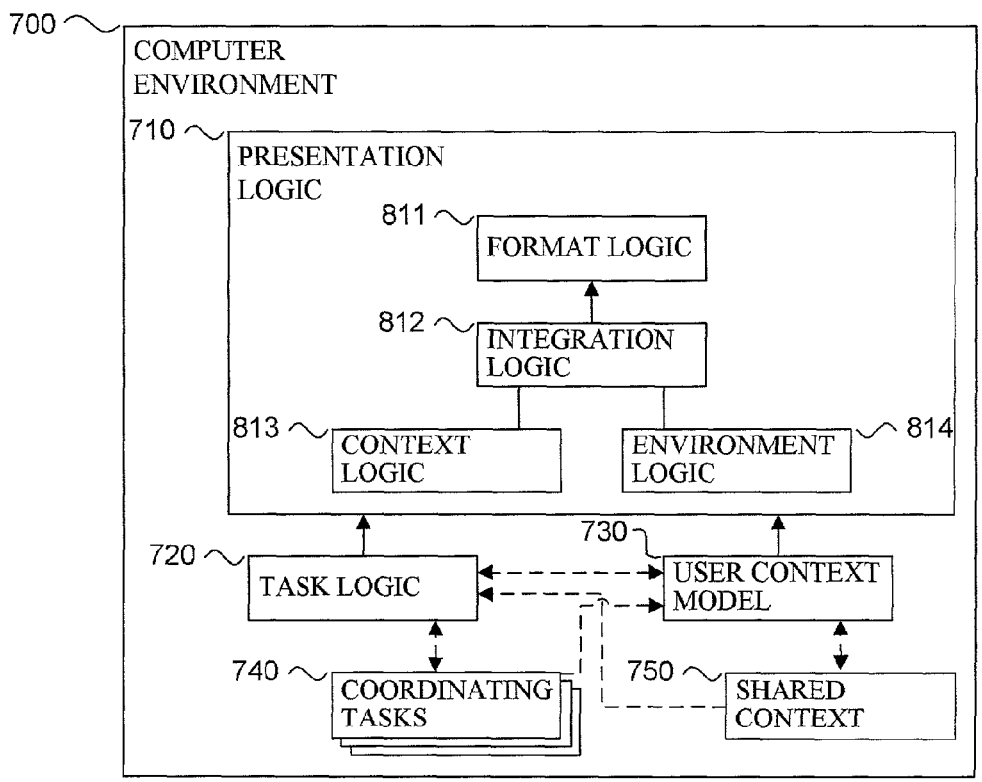
FIG. 8 is a block diagram illustrating additional details of the architecture for augmenting reality.

While the Presentation Logic component can be implemented in a wide variety of ways so that it provides the necessary data structures and logic, a simple architecture is described with respect to FIG. 8. FIG. 8 is a block diagram illustrating additional details of the architecture for augmenting reality, with the focus being on primary data flow rather than control information. The Presentation Logic component illustrated in FIG. 8 includes several sub-components, including Format Logic 811 (optionally determines the appearance of the computer-generated data), Integration Logic 812 (determines how to meaningfully combine/integrate the content with the user's point of view of the perceived world), Content Logic 813 (determines what virtual content (e.g., computer-generation information) is appropriate to present to the user given their current circumstances, such as based on a specific task), and Environment Logic 814 (determines the spatial relationship of objects in the environment, including the user's body).

Format Logic 811

Responsible for presentation of virtual content, and can be implemented in various ways. An example of logic used in this step is as follows:

```
IF DisplayScheme = UnobstructedView
    IF NOT Hazard
        IF AmbientLight = HIGH
            IF NewMessageOfInterest = TRU E
                THEN BlinkNewMessagePeripericon
```

A peripericons in the illustrated embodiments is an iconic visual control that is only displayed in the periphery of the user's position. They do not distract the user from their task, while conveying limited information. They typically do not include text, as users generally do not have sufficient visual acuity to distinguish sufficient detail in the periphery of their vision.

Integration Logic 812

Adapts augmented reality presentation based on context information, and can optionally retrieve appropriate context information so that it is available. Considers the purpose of the potential computer-generated content, and the circumstances of the user. It can also take into account hierarchical and overlapping priorities, such as from multiple themes that each match the current context. An example of logic used in this step includes:

```
IF CurrentVideoDisplayDevice = VideoDisplayTypeHeadStabilized
    IF UserHeadPosition moves
        THEN
    IF AnticipatedUserHeadPosition =UserHeadPosition
        THEN Use AnticipatedVirtualImagePosition
        ELSE Use RecalculateVirtualImagePosition
```

Content Logic 813

Provides various Virtual Objects for presentation that can include image content (text, controls, pictures, avatars, objects, landscapes, personality, etc.) and appearance. In some embodiments this component is not used if the desired computer-generated data is presented directly to the Integration Logic 812. This is typically not possible for an arbitrary number of tasks, however. Even if tasks are coordinating between themselves on which data is most appropriate to display, a general shared mechanism for them to communicate is needed and the data must take into account the user's context, which requires communications with the user's context model. An example of logic used in this step includes:

```
IF PossibleUserPostion = ProximityToHazard
        THEN DisplayHazardIndication, TellGameAboutHazard
    IF CurrentUserMotion or AnticipatedUserMotion = ProximityToHazard
        THEN DisplayProminantHazardIndication, TellGameAbout
            Hazard
    IF CurrentUserMotion = CloseProximityToHazard
        THEN DisplayOnlyProminantHazardindication,
            TellGameAboutHazard
    IF Hazard AN D Emergency AND HighPriorityMessages = FALSE
        IF Theme = Work
            I F ShowIDTags is TRUE
                IF PersonRecogn izedOrIndicated = VISIBLE
                    TH EN DisplayNameTag
```

In some embodiments, the virtual objects are modeled using context information as if they were objects in the physical world.

Environment Logic 814

Provides spatial relationships of user and environment objects, and physical characteristics of user and environment objects (e.g., location, mass, motion, texture, appearance, sound, smell, temperature, etc.). Can be implemented in various ways, such as using a datastore of context attributes (whether user's private datastore or a shared context model). Can provide logic via rule/action pairs maintained in the module or provided by as a service by a separate module, such as by a remote server service.

Task Logic 720

Can include software programs that generate user choices with feedback related to a purpose or goal. A simple implementation could be pairs of two values; Rule and Action. Rules could be potential user locations, and Actions would be what the computer should do if the location is reached. This component can interact with and make use of any software application program that programmatically communicates with a publicly known interface commands, such as Microsoft Office, Valve HalfLife, and various Internet browsers.

User Context Model 730

In the illustrated embodiment, an explicit, extensible, dynamic software model of a user's physical, mental, data, and computer environment.

Coordinating Tasks 740

Optionally, the system can coordinate logic with other tasks. For example, most software applications are capable of initiating and receiving instructions with other software programs, including different levels of operating systems.

Shared Context 750

Optionally, the system can coordinate logic with other context models. Models may be of users, groups of users, or other types of context models (e.g., object, location, process, etc.). Most software applications are capable of initiating and receiving instructions with other software programs, including different levels of operating systems.

The disclosed augmented reality techniques can be used in a variety of scenarios, including the following non-exhaustive list: navigation/routing, conference calls, vehicle operation, role playing games, tours, theme parks, hazard warnings, etc. Examples of uses includes the following.

- Gaming: Multi-user applications are enhanced by the ability of gaming systems to receive abstracted descriptions from multiple users. This decreases the required connectivity bandwidth between players, and simplifies game creation by allowing standardized inter-game user context and action interfaces
- Touring: A user drives down the street, turns their head, and can see the URL or descriptive information associated with the real-world image.
- Military: By incorporating what is typically called "Situational Awareness" with first-person point of view displays, valuable information can be presented to the soldier (e.g., indications of friends and foes, indications of hazardous and safe areas and situations, etc.).
- Surveyors: Longitude/latitude, plot boundaries, and other useful marks can be superimposed on the landscape.
- Emergency Crews: Police officers can be presented with task-related information without explicit commands on their part.
- Operating a Vehicle: The system can detect which car a user 1s driving. Perhaps the user has two cars; a sports car and a large van. They usually drive a sports car, but are currently driving the van. As they approach a curve in the road at a velocity that would be safe in the sports car, but is unsafe in the van, an indication of this situation can be displayed to the user in such a way so as not to excessively distract them and therefore cause a hazard. If they continue to approach the curve at an unsafe speed, the prominence and/or choice of output device can be modified to emphasize the hazard.
- Navigation: Integrated into the user's first person point of view is information useful in determining where they are, and how to follow their current route.

As another example, an augmented reality tour of a physical attraction (such as a town hall or theme park) can be easily created with this system by creating a database of attraction records. Each record can contain real-world characterization information (e.g., location, hours of operation, possible and optimal routes) and user-filtered interest characterizations (e.g., type of attraction, amount of time required, recommendations of trusted reviewers, supplemental details on attraction or attraction elements, etc.). The database data can be made available to an interpretive engine, which by making use of the user's context model's location attributes can determine which attraction the user is closest to and can provide an indication of such without the user's explicit request. This represents a great simplification, since the creation of additional tour applications only requires the collection of new attraction information and the recording of it in a database. Not only can the interpretive engine be reused, but arbitrary changes in the user's context, including the availability of input/output devices, can be disregarded when creating additional tours.

Those skilled in the art will also appreciate that in some embodiments the functionality provided by the routines discussed above may be provided in alternate ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims. In addition, while certain aspects of the invention are presented below in certain claim forms, the inventors contemplate the various aspects of the invention in any available claim form. For example, while only one some aspects of the invention may currently be recited as being embodied in a computer-readable medium, other aspects may likewise be so embodied. Accordingly, the inventors reserve the right to add additional claims after filing the application to pursue such additional claim forms for other aspects of the invention.

The invention claimed is:

1. A computer-readable storage device having instructions recorded thereon for enabling a hand-held computing device to control whether message(s) are blocked, the instructions comprising:
   first instructions for enabling the hand-held computing device to receive a message from a source that is external to the hand-held computing device;
   second instructions for enabling the hand-held computing device to select, based at least in part on a context of a user of the hand-held computing device, one or more filters to apply to the message, the selected one or more filters comprising a first filter when the context of the user indicates that the user is in a first state and a second filter when the context of the user indicates that the user is in a second state that is different from the first state, the first state being a sleeping state, and the first filter being configured to block messages having a priority that is less than a designated priority; and
   third instructions for enabling the hand-held computing device to use the one or more filters to control whether the message is blocked;
   wherein the computer-readable storage device is not a transmission signal.

2. The computer-readable storage device of claim 1, wherein the second instructions comprise:

instructions for enabling the hand-held computing device to de-select at least one of the one or more filters and to select at least one other filter to be applied to a message in response to a change in the context of the user.

3. The computer-readable storage device of claim 1, wherein the third instructions comprise:
instructions for enabling the hand-held computing device to selectively present the message to the user based at least in part on whether the message satisfies criteria of the one or more filters.

4. The computer-readable storage device of claim 3, wherein the third instructions further comprise:
instructions for enabling the hand-held computing device to delay presentation of the message to the user for a designated period of time in response to the message satisfying the criteria of the one or more filters.

5. The computer-readable storage device of claim 3, wherein the third instructions further comprise:
instructions for enabling the hand-held computing device to determine whether to present the message to the user based at least in part on the context of the user in response to the message satisfying the criteria of the one or more filters.

6. A method comprising:
receiving one or more messages for presentation to a user of a hand-held computing device;
detecting that the user of the hand-held computing device is in a sleep state; and
generating a temporary filter, which is to be applied to the one or more messages while the user is in the sleep state based at least in part on the user being in the sleep state, using at least one element including at least one of hardware or a processing unit,
the temporary filter configured to block each message of the one or more messages that has a priority that is less than a designated priority.

7. The method of claim 6, further comprising:
applying the temporary filter to the one or more messages while the user is in the sleep state, the applying the temporary filter includes temporarily blocking at least one message of the one or more messages; and
discontinuing application of the temporary filter in response to the user no longer being in the sleep state.

8. The method of claim 7, wherein discontinuing the application of the temporary filter comprises:
passing the at least one message of the one or more messages for presentation to the user.

9. The method of claim 7, wherein discontinuing the application of the temporary filter comprises:
applying at least one other filter in lieu of the temporary filter to the at least one message of the one or more messages in response to the user no longer being in the sleep state.

10. The method of claim 6, wherein generating the temporary filter comprises:
generating the temporary filter dynamically in response to detecting that the user is in the sleep state.

11. The method of claim 6, wherein generating the temporary filter comprises:
generating the temporary filter to be configured to block each message of the one or more messages that has a priority that is less than a designated priority for a designated period of time.

12. The method of claim 6, wherein detecting that the user of the hand-held computing device is in the sleep state comprises:
sensing a state of a body of the user to detect that the user is in the sleep state.

13. A system comprising:
at least one element including at least one of hardware or a processing unit;
a condition-dependent output supplier (CDOS) system, implemented using the at least one element, configured to determine whether a user of a hand-held computing device is in a sleep state; and
a filtering system, implemented using the at least one element, configured to receive one or more messages for presentation to the user of the hand-held computing device,
the filtering system further configured to generate a temporary filter, which is to be applied to the one or more messages while the user is in the sleep state based at least in part on the user being in the sleep state, the temporary filter configured to block each message of the one or more messages that has a priority that is less than a designated priority.

14. The system of claim 13, wherein the filtering system is further configured to apply the temporary filter to the one or more messages while the user is in the sleep state to temporarily block at least one message of the one or more messages; and
wherein the filtering system is further configured to discontinue application of the temporary filter in response to the user no longer being in the sleep state.

15. The system of claim 14, wherein the filtering system is configured to pass the at least one message of the one or more messages for presentation to the user based at least in part on the user no longer being in the sleep state.

16. The system of claim 14, wherein the filtering system is configured to apply at least one other filter in lieu of the temporary filter to the at least one message of the one or more messages in response to the user no longer being in the sleep state.

17. The system of claim 13, wherein the filtering system is configured to generate the temporary filter dynamically in response to detection that the user is in the sleep state.

18. The system of claim 13, wherein the system includes one or more servers, the one or more servers including the CDOS system and the filtering system; and
wherein the hand-held computing device is a thin client device communicatively coupled to the one or more servers.

19. The system of claim 13, wherein the temporary filter is configured to block each message of the one or more messages that has a priority that is less than a designated priority for a designated period of time.

20. The system of claim 13, wherein the CDOS system is configured to sense a state of a body of the user to determine whether the user is in the sleep state.

21. A method comprising:
receiving a message at a hand-held computing device from a source outside the hand-held computing device;
selecting at the hand-held computing device, based at least in part on a context of a user of the handheld computing device, a set of one or more filters to apply to the message using at least one element including at least one of hardware or a processing unit,
the selected one or more filters comprising a first filter when the context of the user indicates that the user is in a first state and a second filter when the context of the user indicates that the user is in a second state, different than the first state, the first state being a sleeping state, and the first filter being configured to block messages that are not a specified message type.

* * * * *